United States Patent
Cheng et al.

(10) Patent No.: US 11,387,738 B2
(45) Date of Patent: Jul. 12, 2022

(54) CONSTANT ON-TIME FLYBACK CONVERTER AND CONTROL METHOD THEREOF

(71) Applicant: ALPHA AND OMEGA SEMICONDUCTOR INTERNATIONAL LP, Sunnyvale, CA (US)

(72) Inventors: Jung-Pei Cheng, Zhubei (TW); Hung-Ta Hsu, Zhudong Township (TW); Hsiang-Chung Chang, Zhubei (TW); Yueh-Ping Yu, Zhubei (TW); Yu-Ming Chen, Hsinchu (TW)

(73) Assignee: ALPHA AND OMEGA SEMICONDUCTOR INTERNATIONAL LP, Toronto (CA)

( * ) Notice: Subject to any disclaimer, the term of this patent is extended or adjusted under 35 U.S.C. 154(b) by 0 days.

(21) Appl. No.: 17/015,717

(22) Filed: Sep. 9, 2020

(65) Prior Publication Data
US 2021/0257916 A1   Aug. 19, 2021

(30) Foreign Application Priority Data
Feb. 19, 2020   (CN) .......................... 202010103039.1

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 1/0003* (2021.05); *H02M 3/33507* (2013.01); *H02M 3/33515* (2013.01)

(58) Field of Classification Search
CPC .. H02M 1/08; H02M 1/0003; H02M 3/33507; H02M 3/33515; H02M 3/33523
See application file for complete search history.

(56) References Cited

U.S. PATENT DOCUMENTS

| | | | |
|---|---|---|---|
| 9,577,543 B2 | 2/2017 | Lin et al. | |
| 9,755,529 B2 | 9/2017 | Chen et al. | |
| 10,554,140 B1* | 2/2020 | Khamesra | H02M 3/33592 |
| 2014/0185333 A1* | 7/2014 | Yang | H02M 3/33569 |
| | | | 363/21.12 |
| 2017/0117814 A1* | 4/2017 | Adragna | H02M 1/42 |

\* cited by examiner

*Primary Examiner* — Kyle J Moody
*Assistant Examiner* — Lakaisha Jackson
(74) *Attorney, Agent, or Firm* — Chen-Chi Lin

(57) ABSTRACT

When a constant on-time flyback converter is in the switch-on stage, the gate voltage of the switch and the input voltage of the flyback converter adopt the primary side of the transformer to control. The gate voltage is controlled by the second control signal generated by the controller. The flyback converter is then turn off to enter the switch off stage. When the flyback converter is in the switch off stage, the secondary side controller on the secondary side of the transformer, based on the output voltage and output current of the secondary side, sends a first control signal to the primary side controller to control the main switch to turn on. Thus, the flyback converter enters the switch-on stage. Therefore, the calculation complexity is reduced, and there is no need to set a blanking time, such that the flyback converter can be used in high switching frequency applications.

21 Claims, 12 Drawing Sheets

CONSTANT ON-TIME FLYBACK CONVERTER AND CONTROL METHOD THEREOF

CROSS-REFERENCE TO RELATED APPLICATIONS

This application claims the priority benefit of China patent application number 202010103039.1 filed on Feb. 19, 2020 by a common inventor of this Application. The entire Disclosure made in the China patent application number 202010103039.1 is hereby incorporated by reference.

FIELD OF THE INVENTION

This invention relates generally to a conversion circuit. More particularly, the present invention relates to a constant on-time flyback converter and a control method.

BACKGROUND OF THE INVENTION

A flyback converter is a type of switching power supply. Flyback converters can provide isolation between input stage and output stage. Therefore, flyback converters are widely used in AC/DC current switching applications.

Operation of a flyback converter is mainly divided into two stages: switch on and switch off. A primary coil on a primary side of a transformer of the flyback converter is directly connected to an input voltage during the switch on stage. When the current in the primary coil and the magnetic field in the transformer's magnetic core increases, the energy is stored in the magnetic core. During this time the voltage generated at the secondary coil on the secondary side of the transformer is reverse, so that the diode is in reverse bias state and cannot conduct. The voltage and current to the load are supplied by the capacitor on the secondary side.

During the switch off stage, the current in the primary coil is zero, and the magnetic field in the magnetic core begins to decrease. A positive voltage is induced at the secondary coil. The diode on the secondary side is in a positive bias state and conducts. Thus, the switch-on current flows into the capacitor and load at the secondary side, so that the energy stored in the core is transferred to the capacitor and load. The two stages above operate alternately, thus forming the whole operation process of the flyback converter.

A conventional flyback converter applied in AC/DC applications often has a structure as described in FIG. 1 as a prior art. The primary controller 1 is mainly responsible for controlling the on and off operation of the main switch. The secondary controller 2 is mainly responsible for computing the switch-on time Ton and sending on/off instructions. The signals between the primary controller and the secondary controller are transmitted through the Isolator 3. In the circuit shown in FIG. 1, the secondary controller 2 transmits the command signal of switch on to the primary controller 1 through one circuit and the command signal of switch off to the primary controller 1 through another circuit.

There are problems in the switch-on time control mode of the flyback converter of a conventional flyback converter:

First of all, since all the instructions of a conventional flyback converter are computed and transmitted by the secondary controller 2, it is difficult for the secondary controller 2 to directly detect the input voltage and other related information of the primary side. Thus, it will increase the computing complexity of the secondary controller 2. Moreover, the secondary controller 2 needs to be connected to the secondary coil through the resistors to detect the input voltage and other related information of the primary side, but this resistor presents a RC time delay effect with the parasitic capacitor of the pin of the secondary controller 2. Therefore, it affects the waveform of the detection signal in the synchronous rectifier in the system, thus resulting in delayed switch-on by the synchronous rectifier delay and reducing the efficiency of the synchronous rectifier. U.S. patent U.S. Pat. No. 9,577,543B2 to Lin et al. discloses an isolated converter with constant on-time, which adopts a secondary controller to control the on-off time of the whole converter, but has the same problems discussed above.

Secondly, the switch command of a conventional flyback converter is sent to the primary controller 1 after being computed by the secondary controller 2. It will inevitably lead to signal error in the transmission process, so that additional on/off Blanking Time needs to be set in such flyback converter to eliminate wrong switching instructions caused by transmission errors. It makes such flyback converters unable to be applied in high switching frequency scenarios. U.S. patent U.S. Pat. No. 9,755,529B2 to Chen et al. discloses a flyback converter, which uses a secondary controller to control the switch on time of the whole converter, but has also shown the same problems discussed above.

SUMMARY OF THE INVENTION

A constant on-time flyback converter comprises a transformer, a main switch, an isolator, a primary controller, a secondary controller, a receiving unit, a driving unit, and a first control unit. The receiving unit outputs the first control signal as a trigger-on signal. The driving unit receives the first control signal and output a gate-on control signal to turn on the main switch. The first control unit receives the gate-on control signal and generates a second control signal as a trigger-off signal after a constant on-time. The driving unit receives the second control signal to output a gate-off control signal to turn off the main switch.

DETAILED DESCRIPTION OF THE INVENTION

FIGs provide illustrative examples.

Different examples may be combined with one another.

Figure 1:
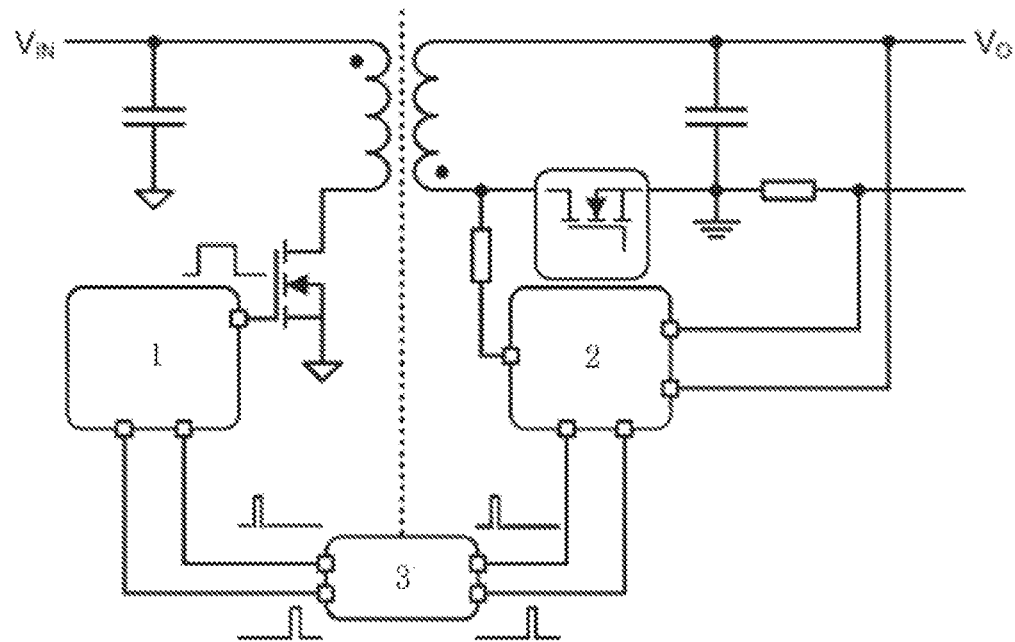
FIG. 1 is a circuit diagram of a flyback converter in the prior art.
Figure 2:
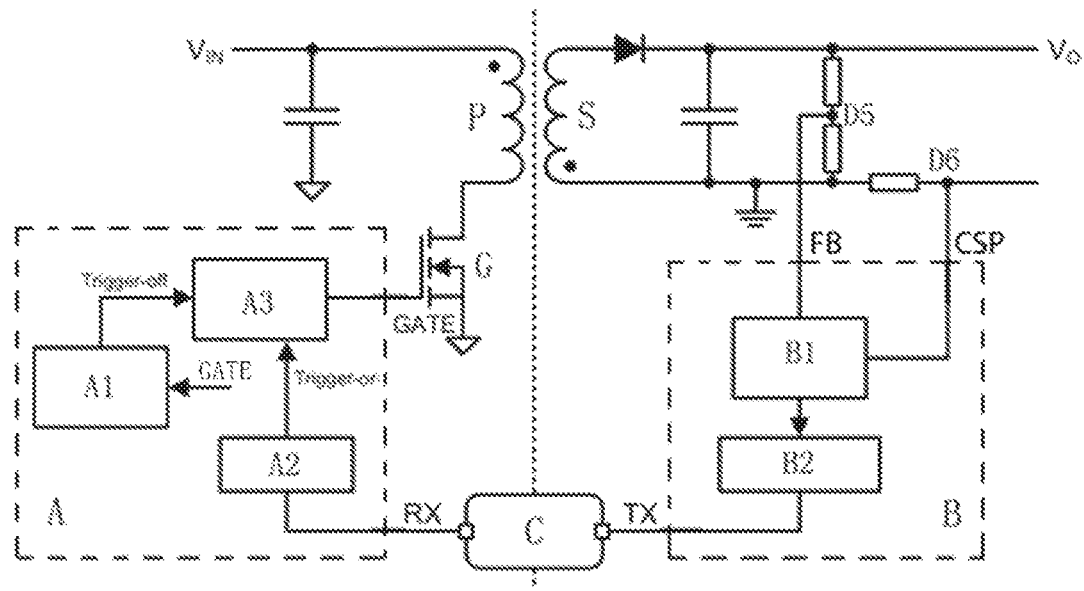
FIG. 2 is a general circuit block diagram of the flyback converter in examples of the present disclosure.

The present disclosure provides a flyback converter with constant on-time control to overcome the problems in conventional flyback converters. A general circuit framework of the flyback converter is shown in FIG. 2. One end of a primary coil P on the primary side of a transformer of the flyback converter is connected to an input terminal $V_{IN}$ of the flyback converter. The other end is grounded through a main switch G. A gate of the main switch connected to an output terminal of the primary controller A receives a gate control signal output from the primary controller A, and controls the main switch G to switch on and off flyback converter. One end of a secondary coil S on the secondary side of the transformer of the flyback converter is connected, directly or through a diode, to an output terminal $V_O$ of the flyback converter, and the other end is connected to a reference ground potential of the secondary side.

A secondary controller B is coupled to the secondary side to obtain output information of the flyback converter to generate a first control signal. The primary controller A comprises a first control unit A1, a receiving unit A2 and a driving unit A3. An input terminal of the receiving unit A2 is connected to the secondary controller B through an Isolator C, and receives the first control signal sent by the secondary controller B through the Isolator C; an output terminal of the receiving unit A2 outputs the first control signal and is coupled to the driving unit A3 as a trigger-on signal to trigger the driving unit A3 to output a gate-on control signal to turn on the main switch G. The first control unit A1 of the primary controller A receives the gate-on control signal output by the driving unit A3 at the same time, and after a fixed on-time Ton, outputs a second control signal and is coupled to the driving unit A3 as a trigger-off signal to trigger the driving unit A3 to output a gate-off control signal to turn off the main switch G.

Further, as shown in FIGS. 3, 5, 9, 12 and 15, the primary controller A includes a first control unit A1, a first input terminal of the first control unit A1 is connected to a first voltage terminal, a second input terminal of the first control unit A1 is connected to a gate control signal GATE of the main switch G, and the output terminal of the first control unit A1 is connected to a reset terminal R of the trigger A4. As such, the first control unit A1 generates the second control signal by processing the first voltage input from the first voltage terminal and the gate voltage of the gate-on signal at the main switch and outputs it to the reset terminal R of the trigger A4. The first voltage at the first voltage terminal is proportional to the input voltage $V_{IN}$ of the flyback converter.

The primary controller A also includes a receiving unit A2, which is connected between the Isolator C and a set terminal S of the trigger A4 to output the first control signal to the set terminal S of the trigger A4. An output terminal Q of the trigger A4 is connected to the gate of the main switch G through the driving unit A3. When the receiving unit A2 outputs the first control signal to the set terminal S of the trigger A4, the driving unit A3 drives the main switch G to turn on, thereby driving the flyback converter to enter the switch on stage. When the first control unit A1 outputs the second control signal to the resetting terminal R of the trigger A4, the driving unit A3 drives the main switch G to switch off, thereby driving the flyback converter to enter the switch off stage. When the main switch G is switched on, the first control unit A1 obtains and outputs a second control signal by processing the first voltage, and when the main switch G is turn off, the first control unit A1 does not output a second control signal.

Specifically, the operation principle of the above described flyback converter of the present invention is as follows:

When the flyback converter is in the switch on stage, the primary coil P is directly connected to the loop at the input voltage, the current in the primary coil P and the magnetic field in the transformer magnetic core increase, and the energy is stored in the core. The voltage generated in the secondary coil S is reverse, so that the diode on the S side of the secondary coil is in reverse bias state and cannot conduct. The capacitor on the S side of the secondary coil provides voltage and current to the load.

The first control unit A1 obtains the first voltage from the first voltage terminal and the gate voltage from the main switch G, so the second control signal (high level signal) can be generated and transmitted to the resetting terminal R of the trigger A4 after a period of $T_{ON}$ processed through the circuit, so that the output terminal Q of the trigger A4 outputs a low level signal, which reduces the gate voltage controlling the main switch G via the driving unit A3 and thus turn off the main switch G, thus making the flyback converter entering the stage of switch off.

When the flyback converter is in the switch off stage, the current flowing through the main switch G is 0, and the magnetic field in the core begins to decrease. A positive voltage is induced on the secondary coil S, thus the diode on the S side of the secondary coil is in positive bias state and conducts, and the switched-on current flows into the capacitor and load on the S side of the secondary coil, as such the energy stored in the core is transferred to the capacitor and load.

The first control unit A1 is unable to obtain at least one of the first voltage from the first voltage terminal and the gate voltage of the gate-on control signal from the main switch G, and therefore does not generate the second control signal. Because the diode on the S side of the secondary coil conducts current, the controller B on the secondary side can receive a signal and process the output information of the converter to generate the first control signal to be received by unit A2 in the primary controller A through the Isolator C. The receiving unit A2, accordingly, outputs the first control signal (high level signal) to the set terminal S of the trigger A4, so that the output terminal Q of the trigger A4 outputs a high-level signal, and the gate voltage of the main switch G that is controlled by the driving unit A3 increases so that the main switch G is turned on, thus enabling the flyback converter to be switched on.

The above two stages run alternately, thus forming the operating process of flyback converter in the present invention.

In the technical scheme of the present invention, the primary controller is used to calculate and control the switch-on time of the main switch, and the input voltage and other relevant information at the primary side are easy to obtain, greatly reducing the computing complexity and posing no influence to the detection of the synchronous rectifier in the system. In addition, the computing process of the switch-on time is placed on the primary side, avoiding the process of the secondary side computing and transmitting instructions to the primary side. The secondary controller needs to transmit the signal only when the switch on the primary controller is switched on, thus saving transmission line and avoiding transmission error. Therefore, it is no need to set the on/off blanking time in the system, so that the flyback converter in the present invention can be applied in scenarios with high switching frequency and the flyback converter has wider range of application.

Several specific implementation modes of flyback converter in the technical scheme of the present invention are described in details as below.

Example 1

Figure 3:
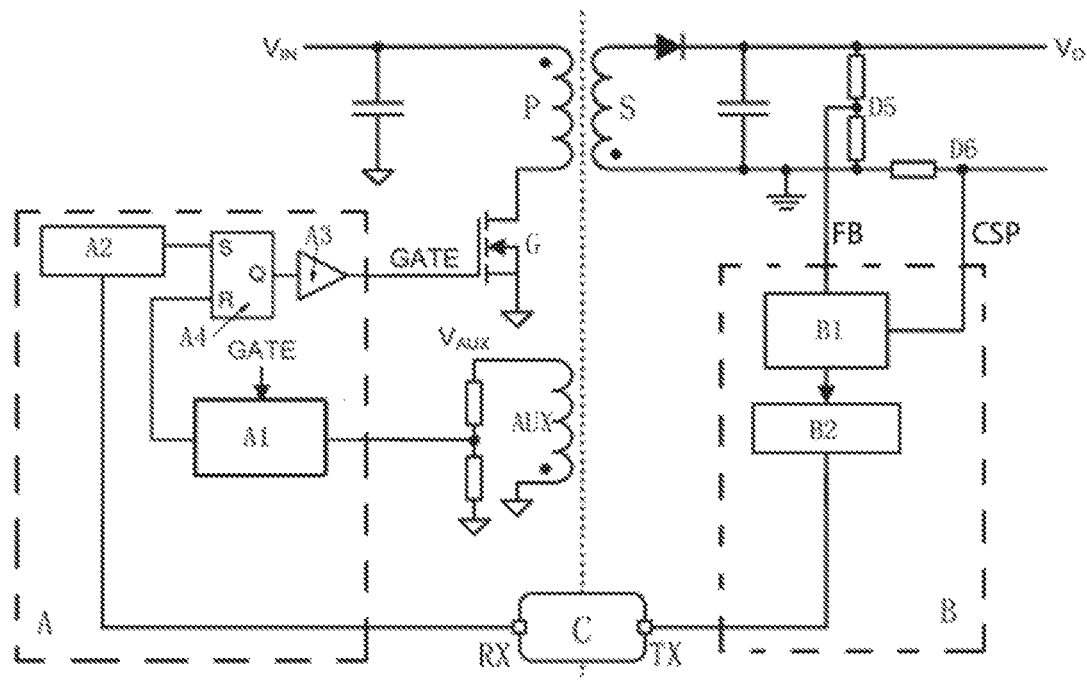
FIGS. 3-4 are the circuit diagram of the flyback converter in examples of the present disclosure.
Figure 4:
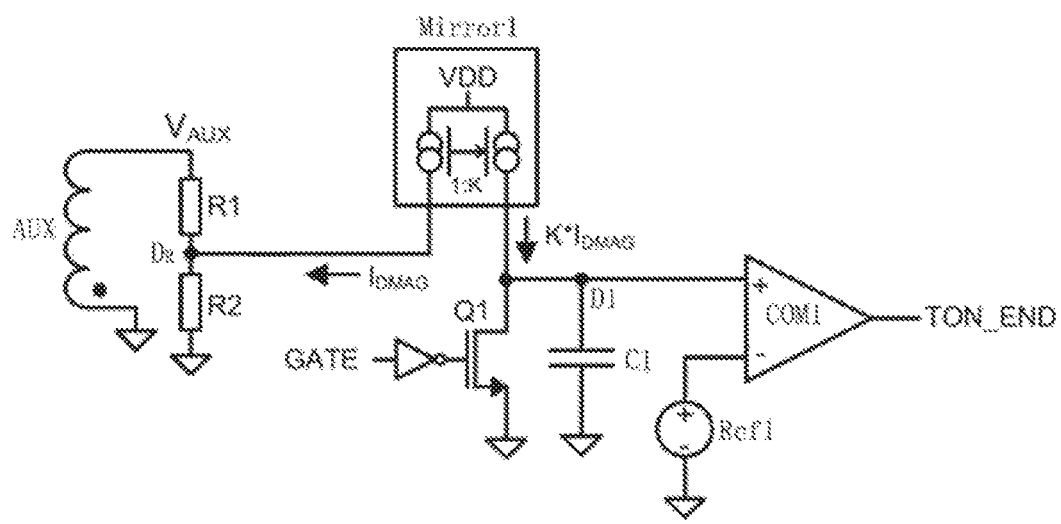

In this example, as shown in FIG. 3, the flyback converter operates in Discontinuous Conduction Mode (DCM). As shown in FIG. 4, the first control unit A1 further includes a first amplifier module Mirror1, an input terminal of the first amplifier module is connected to the first voltage terminal, an output terminal of the first amplifier module is connected to a positive input terminal of a first comparator COM1 through a first node D1, and the first amplifier module Mirror1 is used to amplify a current flowing through the first amplifier module Mirror1 by a first preset multiple K before output.

The first control unit A1 further includes a first field effect transistor Q1, a gate of the first field effect transistor Q1 is connected to the gate of the main switch through an inverter, a drain of the first field effect transistor Q1 is connected to the positive input terminal of the first comparator COM1 through the first node D1, and a source of the first field effect transistor Q1 is grounded.

The first control unit A1 further includes a first capacitor C1, one end of the first capacitor C1 is connected to the positive input terminal of the first comparator COM1 through the first node D1, and the other end is grounded.

The first control unit A1 further includes a first reference terminal Ref1, which is connected to an inverting input terminal of the first comparator COM1 to provide a first reference voltage. An output terminal of the first comparator COM1 is connected to the output terminal of the first control unit A. When a voltage value of the positive input terminal of the first comparator COM1 is greater than the first reference voltage, the output terminal of the first comparator outputs the second control signal.

In this example, the first voltage terminal connects an auxiliary coil AUX through a first resistor R1, and there is a predetermined turn ratio between the auxiliary coil AUX and the primary coil P, so that the first voltage $V_{AUX}$ is proportional to the input voltage $V_{IN}$ of the input terminal of the flyback converter.

In addition, the first amplifier module is actually a current mirror Mirror1, which amplifies the input current by a first predetermined multiple K and then outputs. The Mirror1 is also connected to an external voltage VDD.

Specifically, when the flyback converter is in the switch on stage, the first amplifier module Mirror1 receives the demagnetization current ($I_{DMAG}$) transmitted through the first voltage terminal, which is detected by a current detection pin of an auxiliary winding. Then the first amplifier module Mirror1 amplifies the demagnetizing current by a first predetermined multiple K ($k*I_{DMAG}$) and outputs it to the positive input terminal of the first comparator COM1. The first predetermined multiple K is a fixed value, and its possible value range can be 0.001 to 0.1, preferably 0.01.

Accordingly, the first reference terminal Ref1 continuously inputs a first reference voltage to the inverting input terminal of the first comparator COM1, and the possible value range of the first reference voltage is 0.1V to 5V, preferably 2V. Then the first comparator COM1 continuously compares the input signals from its positive and inverting input terminals. When the input signal from the positive input terminal is higher than the first reference voltage from its inverting input terminal, the output terminal of the first comparator COM1 outputs a high-level signal as the second control signal (TON_END). In other words, based on the circuit composition and signal processing process of the first control unit A1, the turn-on time ($T_{ON}$) of the whole flyback converter is determined by K times of the demagnetizing current ($K*I_{DMAG}$), the capacitance value of the first capacitor C1 and the first reference voltage, which is derived of as follows:

$$I = C \cdot \frac{V_{REF\_ON}}{T_{ON}}; \quad (1)$$

I is the demagnetizing current ($K*I_{DMAG}$) of K times;
C is the capacitance value of the first capacitor C1;
$V_{REF\_ON}$ is the voltage value of the first reference voltage;
$T_{ON}$ is the switch on time of the flyback converter.

According to the above formula (1), it can be concluded that:

$$I \cdot T_{ON} = C \cdot V_{REF\_ON}; \quad (2)$$

Since the capacitance value C of the first capacitor C1 and the voltage value $V_{REF\_ON}$ of the first reference voltage are both fixed, the right side of the equation is a fixed value, which means that the left side of the equation is also a fixed value. The demagnetization current of K times is obtained according to $V_{IN}$, K is a fixed value, therefore, the value of $V_{IN} \cdot T_{ON}$ is also fixed.

In DCM mode, the switching frequency of the main switch of the flyback converter can be obtained by the following formula:

$$f_s = \frac{2 \cdot L_m \cdot P_O}{(V_{IN} \cdot T_{ON})^2}; \quad (3)$$

In which,
$f_s$ is used to represent the switching frequency of the main switch;
$L_m$ is used to represent the inductance of the primary coil;
$P_O$ is used to represent the output power of the secondary side, which is related to the input voltage $V_{IN}$ of the primary side;

Considering that $V_{IN} \cdot T_{ON}$ is fixed, the turn-on time of the main switch is fixed in relation to the change of the input voltage $V_{IN}$, which means that the turn-on time of the flyback converter is fixed.

Further, in this example, the resistance value of the first resistor R1 can be determined by the following formula:

$$R1 = \frac{N_A}{N_P} \cdot K \cdot \frac{1}{C \cdot R_{RFF\_ON} \cdot \sqrt{\frac{f_s}{2 \cdot L_m \cdot P_o}}}; \quad (4)$$

In which,
$N_A$ is used to indicate the number of winding turns of the auxiliary winding AUX;

$N_P$ is used to represent the number of winding turns of the primary coil P;

According to the above formula (3), the turn-on time $T_{ON}$ can be obtained by the following formula:

$$T_{ON} = \sqrt{\frac{2 \cdot L_m \cdot P_O}{V_{IN}^2 \cdot f_s}} ; \quad (5)$$

The theoretical $T_{ON\_Design}$ value can be expressed by the following formula:

$$T_{ON} = \frac{C \cdot R_{RFF\_ON}}{V_{IN} \cdot \text{gain}} \quad (6)$$

In which, gain is used to represent the theoretical gain value.

According to the formula (5) and (6) above, it can be deduced (assuming $T_{ON} = T_{ON\_Design}$):

$$\text{gain} = C \cdot R_{RFF\_ON} \cdot \sqrt{\frac{f_s}{2 \cdot L_m \cdot P_O}} ; \quad (7)$$

At the same time, the gain value can also be expressed as:

$$\text{gain} = \frac{N_A}{\frac{N_P}{R1}} \cdot K; \quad (8)$$

Thus the above formula (4) can be obtained by combining the above formula (7) and (8), so as to determine the resistance value of the first resistance R1.

Alternatively, in this example, there is a connection node $D_R$ between the first voltage terminal and the first resistance R1 as shown in FIG. 4. Then, the flyback converter also comprises a second resistor R2, which is connected between the connection node $D_R$ and the grounding terminal. The second resistor R2 can be selectively configured according to the actual situation, which will not be described here.

Example 2

Figure 5:
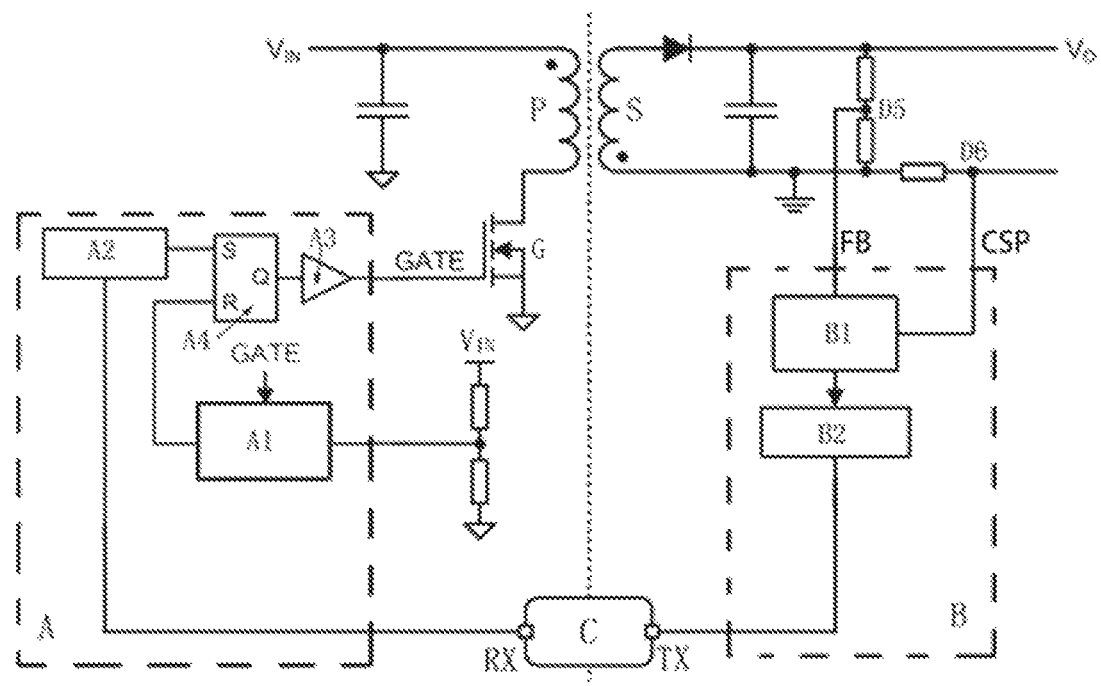
FIGS. 5-6 are the circuit diagrams of the flyback converter in examples of the present disclosure.
Figure 6:
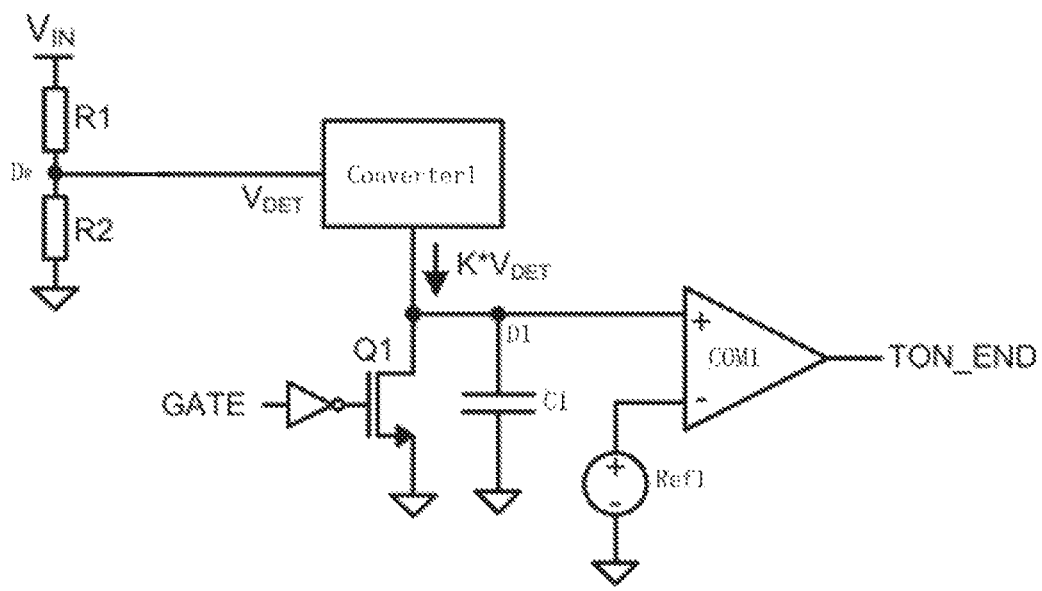

In this example, as shown in FIG. 5, the flyback converter operates in DCM mode. As shown in FIG. 6, the first control unit A1 further includes the first amplifier module Converter1, the input terminal of the first amplifier module Converter1 is connected to the first voltage terminal (at the same time, the first amplifier module Converter1 is also connected to an external voltage VDD, which will not be described in detail here). The output terminal of the first amplifier module Converter1 is connected to the positive input terminal of a first comparator COM1 through a first node D1, and the first amplifier module Converter1 is used to amplify the input voltage by a first predetermined multiple K before output.

The first control unit A1 further includes the first field effect transistor Q1, the gate of the first field effect transistor Q1 is connected to the gate of the main switch through an inverter, the drain of the first field effect transistor Q1 is connected to the positive input terminal of the first comparator COM1 through the first node D1, and the source of the first field effect transistor Q1 is grounded.

The first control unit A1 further includes the first capacitor C1, one end of the first capacitor C1 is connected to the positive input terminal of the first comparator COM1 through the first node D1, and the other end is grounded.

The first control unit A1 further includes the first reference terminal Ref1, which is connected to the inverting input terminal of the first comparator COM1 to provide a first reference voltage. The output terminal of the first comparator COM1 is connected to the output terminal of the first control unit A1. When the voltage value of the positive input terminal of the first comparator COM1 is greater than the first reference voltage, the output terminal of the first comparator outputs the second control signal. The first voltage terminal is connected to the input terminal of the flyback converter through a first resistor R1, so that the first voltage is proportional to the input voltage $V_{IN}$ of the input terminal of the flyback converter.

The first control unit A1 further includes a connection node $D_R$ arranged between the first voltage terminal and the first resistor R1.

The flyback converter also includes a second resistor R2, which is connected between the connection node $D_R$ and the grounding terminal.

The difference between the present example and the first example is as follows:

a. The first voltage generated by the first voltage terminal is no longer the voltage generated by the auxiliary winding and proportional to the input voltage $V_{IN}$, but the input voltage $V_{IN}$ directly detected so as to obtain the first voltage $V_{DET}$ proportional to the input voltage $V_{IN}$.

b. The first amplifier module in the present example is no longer a current mirror, but a voltage to current converter module Converter1, which converts the first voltage $V_{DET}$ into $K \cdot V_{DET}$ at a first predetermined multiple K and outputs it.

c. The first predetermined multiple K in this example can be expressed as:

$$K = \frac{I_{OUTPUT}}{V_{INPUT}}; \quad (9)$$

In which, $I_{OUTPUT}$ represents the output current of the first amplifier module;

$V_{INPUT}$ represents the input voltage of the first amplifier module.

Further, the value range of the first predetermined multiple K can be [0.1 µA/V, 100 µA/V], preferably 2 µA/V.

4) The second resistor R2 in the example is a required circuit component, and the resistance relationship between the first resistor R1 and the second resistor R2 can be determined by the following formula:

$$\begin{cases} \text{gain} = C \cdot V_{REF\_ON} \cdot \sqrt{\frac{f_s}{2 \cdot L_m \cdot P_O}} \\ \text{gain} = \frac{R2}{R1 + R2} \cdot K \end{cases} ; \quad (10)$$

In which, gain is used to express the theoretical gain value;

C is used to represent the resistance value of the first capacitor C1;

$V_{REF\_ON}$ is used to represent the voltage value of the first reference voltage;

$f_s$ is used to represent the switching frequency of the main switch;

$L_m$ is used to represent the inductance of the primary coil;

$P_O$ is used to represent the output power of the secondary side;

R1 is used to represent the resistance value of the first resistor;

R2 is used to represent the resistance value of the second resistor;

K is used to represent the first preset multiple, which is calculated as in formula (9) above.

The derivation process of the above formula (10) is similar to the above formula (5)-(8), which will not be repeated here.

Example 3

Figure 7:
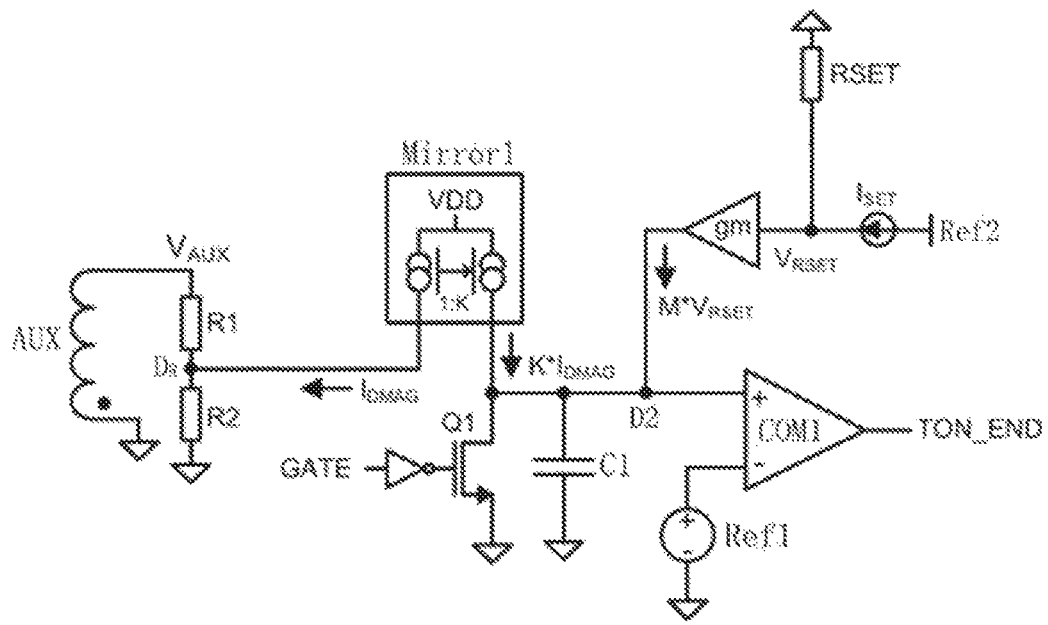
FIG. 7 is a circuit diagram of flyback converter in examples of the present disclosure.

In this example, the flyback converter operates in Continuous Conduction Mode (CCM), and its general circuit diagram is the same as shown in FIG. 3. As shown in FIG. 7, the first control unit A1 includes the first amplifier module, where the input terminal of the first amplifier module is connected to the first voltage terminal, and the output end of the first amplifier module is connected to the positive input terminal of a first comparator COM1 through a second node D2. The first amplifier module is used to amplify the current flowing through the first amplifier module by a first predetermined multiple K, and then output it. In this example, the first amplifier module is realized by a current mirror Mirror1.

The first control unit A1 further includes a first field effect transistor Q1, where the gate of the first field effect transistor Q1 is connected to the gate of the main switch through an inverter, the drain of the first field effect transistor Q1 is connected to the positive input terminal of the first comparator through the second node, and the source of the first field effect transistor Q1 is grounded.

The first control unit A1 further includes a first capacitor C1, one end of the first capacitor C1 is connected to the positive input terminal of the first comparator COM1 through the second node D2, and the other end is grounded.

The first control unit A1 further includes the first reference terminal Ref1, which is connected to the inverting input terminal of the first comparator COM1 to provide a first reference voltage.

The first control unit A1 further includes a reference module, where the input terminal of the reference module is connected to a set voltage terminal with a predetermined voltage value, and the output end of the reference module is connected to the positive input end of the first comparator COM1 through the second node D2. The reference module is used for amplifying the voltage input to the reference module before output. The output terminal of the first comparator COM1 is connected to the output terminal of the first control unit A1.

When the voltage value of the positive input terminal of the first comparator COM1 is greater than the first reference voltage, the output terminal of the first comparator outputs the second control signal.

The first voltage terminal is connected to an auxiliary coil AUX through a first resistor R1, and there is a predetermined turn ratio between the auxiliary coil AUX and the primary coil P, so that the first voltage $V_{AUX}$ is proportional to the input voltage $V_{IN}$ of the flyback converter's input terminal. A connection node $D_R$ is arranged between the first voltage terminal and the first resistor R1.

The flyback converter also includes a second resistor R2, which is connected between the connection node $D_R$ and the grounding terminal.

The first amplifier module in this example can also be a current mirror Mirror1. The structure, working mode and setting of the first predetermined multiple K of the current mirror Mirror1 can refer to Example 1, which will not be described here.

The first voltage terminal in this example also detects the winding voltage of the auxiliary coil and obtains the first voltage $V_{AUX}$ proportional to the input voltage $V_{IN}$ of the flyback converter. The connection relationship between the first voltage terminal and the auxiliary coil, the first resistor R1 and the second resistor R2 is the same as that of the first example, which will not be further discussed here.

In this example, the resistance range of the first resistor R1 can be 50KΩ-2 mΩ. Alternatively, the second resistor R2 can be selectively configured according to the actual situation, which will not be discussed here.

Further, in this example, as shown in FIG. 7, the set voltage terminal includes a reference resistor $R_{SET}$ and a set current terminal Ref2, which are respectively connected to the input terminal of the reference module. The reference resistor $R_{SET}$ has a predetermined resistance value, and the setting current terminal Ref2 has a predetermined input current $I_{SET}$;

As a result, the above reference module includes an amplifier gm, where the input terminal of the amplifier gm is taken as the input terminal of the reference module, and the output terminal of the amplifier is connected to the first comparator COM1 through the second node D2. The amplifier gm is used to amplify the output voltage from the set voltage terminal at a second predetermined multiple M before output.

Specifically, in this example, on the basis of Example 1, a reference module and a set voltage terminal are added. The set voltage terminal obtains a reference input voltage $V_{RSET}$ by setting the input current $I_{SET}$ and $R_{SET}$, which is then amplified at the second predetermined multiple M after being processed by the amplifier gm to form and output $M \cdot I_{SET}$ for comparison.

The value range of the second predetermined multiple M can be 0.1 μA/V to 100 μA/v, preferably 1 μA/v.

The value range of the voltage $V_{RSET}$ output by the above set voltage terminal for reference can be 0.1V to 5V, preferably 0.65 v.

The resistance range of the reference resistor RSET can be 0Ω-10KΩ.

Then, the input signal of the positive input terminal of the first comparator COM1 is determined by $K \cdot I_{DMAG}$, $M \cdot V_{RSET}$, the capacitance value C of the first capacitor C1 and the reference voltage $V_{REF\_ON}$, and its working principle is the same as the above examples, that is, when the flyback converter is in the switch-on stage, the first control unit A1 starts to work. When the input signal of the positive input terminal of the first comparator COM1 is greater than the reference voltage $V_{REF\_ON}$ of the inverting input terminal, the output terminal of the first comparator COM1 outputs a second control signal (high level signal) to control the main switch G to disconnect, and the flyback converter enters the switch-off stage.

Example 4

In this example, the flyback converter works in CCM mode, and its overall circuit diagram is shown in FIG. 3.

Figure 8:
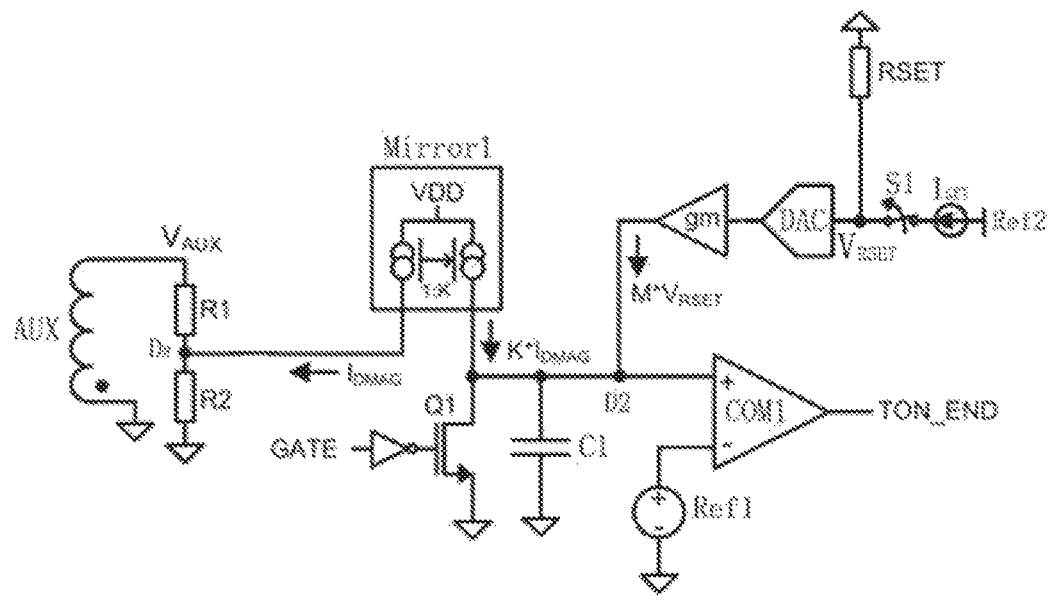
FIGS. 8-9 are the circuit diagrams of the flyback converter in examples of the present disclosure.

As shown in FIG. 8, the first control unit A1 includes a first amplifier module, the input terminal of the first amplifier module is connected to the first voltage terminal, the output end of the first amplifier module is connected to the positive input terminal of the first comparator COM1 through a second node D2. The first amplifier module is used to amplify the current flowing through the first amplifier module by a first predetermined multiple before output. In this example, the first amplifier module is realized by a current mirror Mirror1.

The first control unit A1 further includes a first field effect transistor Q1, where the gate of the first field effect transistor is connected to the gate of the main switch through an inverter, the drain of the first field effect transistor Q1 is connected to the positive input terminal of the first comparator COM1 through the second node D2, and the source of the first field effect transistor Q1 is grounded.

The first control unit A1 further includes a first capacitor C1, one end of the first capacitor C1 is connected to the positive input terminal of the first comparator COM1 through the second node D2, and the other end is grounded.

The first control unit A1 further includes a first reference terminal REF1, which is connected to the inverting input terminal of the first comparator COM1 to provide a first reference voltage.

The first control unit A1 further includes a reference module, the input terminal of the reference module is connected to a set voltage terminal with a predetermined voltage value, and the output end of the reference module is connected to the positive input end of the first comparator COM1 through the second node D2. The reference module is used for amplifying the voltage input to the reference module before output. The output terminal of the first comparator COM1 is connected to the output terminal of the first control unit A1.

When the voltage value of the positive input terminal of the first comparator COM1 is greater than the first reference voltage $V_{REF\_ON}$, the output terminal of the first comparator COM1 outputs the second control signal.

The set voltage terminal comprises a reference resistor $R_{SET}$ and a set current terminal Ref2, which are respectively connected to the input terminal of the reference module.

The first control unit A1 further includes a switch S1 arranged between the set current terminal Ref2 and the input terminal of the reference module. The switch S1 is initially switched on. When the input current of the set current terminal Ref2 is set, the switch S1 is disconnected.

The reference module further includes a digital analog converter (DAC), the input terminal of the DAC is used as the input terminal of the reference module. After switching off S1, the DAC is used to lock the input voltage $V_{RSET}$ transmitted by the set current terminal Ref2. The reference module further includes an amplifier gm, the input end of the amplifier gm is connected to the output terminal of DAC, and the output terminal of the amplifier gm is connected to the first comparator COM1 through the second node D2. The amplifier gm is used to amplify the voltage $V_{RSET}$ output from the set voltage terminal at the second predetermined multiple M and then output.

The first voltage terminal is connected to an auxiliary coil AUX through a first resistor R1. The auxiliary coil AUX and the primary coil P have a predetermined turn ratio, so that the first voltage is proportional to the input voltage $V_{IN}$ of the input terminal of the flyback converter. A connection node $D_R$ is arranged between the first voltage terminal and the first resistor R1.

The flyback converter further includes a second resistor R2, which is connected between the connection node $D_R$ and the grounding terminal.

Figure 9:
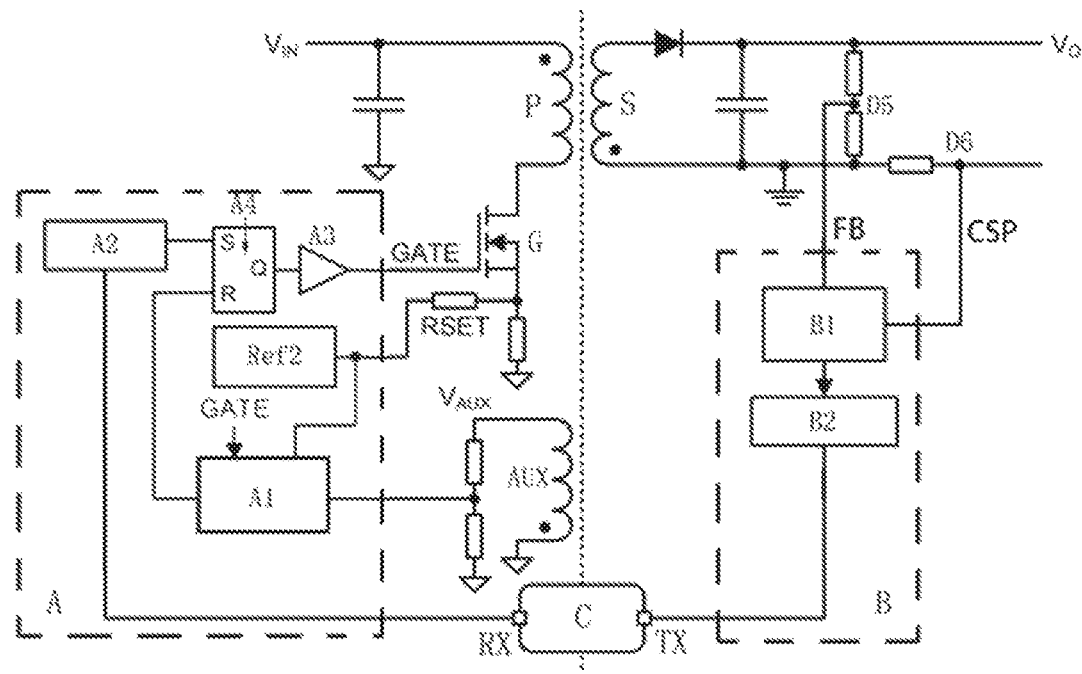

The only difference between the present example and the third example is that a switch S1 is arranged at the set voltage terminal. Therefore, the set voltage terminal can be locked in the actual operation of the system. The specific principle is: first, turn on the switch S1, and set the input current $I_{SET}$ at the setting current terminal Ref2. After setting, turn off the switch S1, and the corresponding input voltage is locked in DAC. The advantage of this is that since the input voltage $V_{RSET}$ can be locked in the DAC, there is no need to lead out an additional pin to set the reference resistor $R_{SET}$, which can be directly connected to the original pin in the system (for example, as shown in FIG. 9).

In this example, the rest of the circuit structure and working principle are the same as in Example 3, which will not be further described here.

Example 5

In this example, the flyback converter works in CCM mode, and its overall circuit diagram is shown in FIG. 5.

Figure 10:
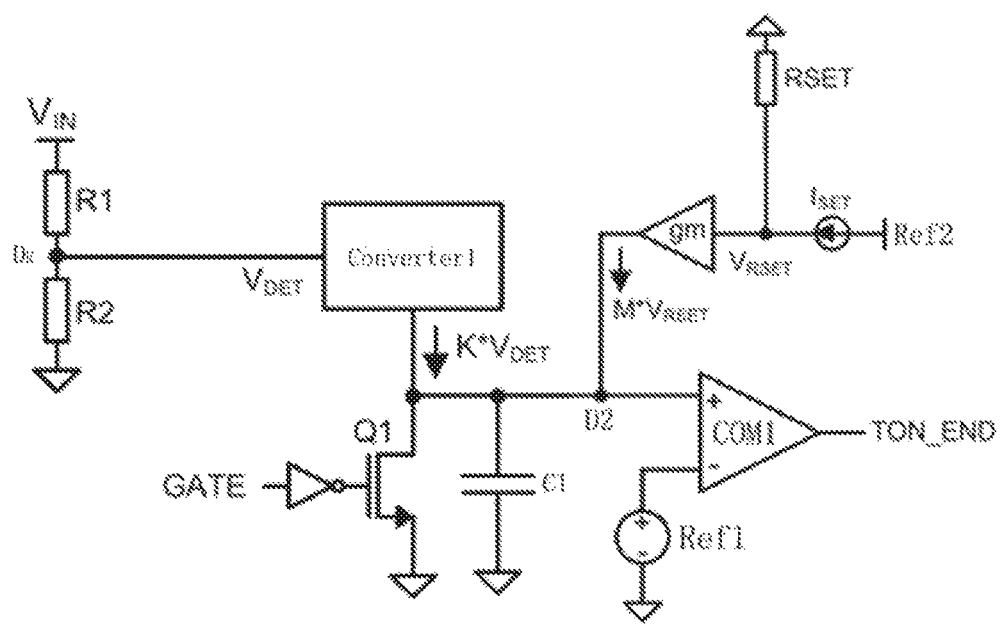
FIG. 10 is a circuit diagram of the flyback converter in examples of the present disclosure.

As shown in FIG. 10, the first control unit A1 includes a first amplifier module Converter1, the input terminal of the first amplifier module Converter1 is connected to the first voltage terminal, the output terminal of the first amplifier module Converter1 is connected to the positive input terminal of the first comparator COM1 through a second node D2, and the first amplifier module Converter1 is used to amplify the input voltage by a first predetermined multiple K before output.

The first control unit A1 further includes a first field effect transistor Q1, the gate of the first field effect transistor Q1 is connected to the gate of the main switch through an inverter, the drain of the first field effect transistor Q1 is connected to the positive input terminal of the first comparator through the second node D2, and the source of the first field effect transistor Q1 is grounded.

The first control unit A1 further includes a first capacitor C1, one end of the first capacitor C1 is connected to the positive input terminal of the first comparator COM1 through the second node D2, and the other end is grounded.

The first control unit A1 further includes a first reference terminal REF1, which is connected to the inverting input terminal of the first comparator COM1 to provide a first reference voltage $V_{REF\_ON}$.

The first control unit A1 further includes a reference module, the input terminal of the reference module is connected to a set voltage terminal with a predetermined voltage value, and the output end of the reference module is connected to the positive input terminal of the first comparator COM1 through the second node D2. The reference module is used for amplifying the voltage input to the reference module before output. The output terminal of the first comparator COM1 is connected to the output terminal of the first control unit A1. When the voltage value of the positive input terminal of the first comparator COM1 is greater than the first reference voltage $V_{REF\_ON}$, the output terminal of the first comparator COM1 outputs the second control signal.

The set voltage terminal includes a reference resistor $R_{SET}$ and a set current terminal Ref2, which are respectively connected to the input terminal of the reference module. The reference resistor $R_{SET}$ has a predetermined resistance value, and the set current terminal Ref2 has a predetermined input current $I_{SET}$;

The above described reference module includes an amplifier gm, the input terminal of the amplifier gm is taken as the input terminal of the reference module, the output terminal of the amplifier gm is connected to the first comparator COM1 through the second node D2, and the amplifier gm is used to amplify the voltage $V_{RSET}$ output from the set voltage terminal by the second predetermined multiple M and then output.

The first voltage terminal is connected to the input terminal of flyback converter through a first resistor R1, so that the first voltage is proportional to the input voltage $V_{IN}$ of the input terminal of flyback converter. A connection node $D_R$ is arranged between the first voltage terminal and the first resistor R1.

The flyback converter also includes a second resistor R2, which is connected between the connection node $D_R$ and the grounding terminal.

The difference between this example and Example 3 is that the first voltage terminal in this example no longer provides the auxiliary winding voltage $V_{AUX}$ by the auxiliary coil AUX, but directly detects the input voltage $V_{IN}$ of the primary side to obtain the first voltage proportional to the input voltage $V_{IN}$. The second resistor R2 in this example is a required resistor. Moreover, the first amplifier module in this example is realized by the voltage to current module Converter1. In other words, the circuit structure of the first control unit A1 in the present example can be obtained by combining the structure setting of the first voltage terminal in the second example with the rest of the structure settings in the third example. Specifically, in this example, the resistance values of the first resistor R1 and the second resistor R2 can be determined by the above formula (10), the first predetermined multiple K can be determined by the above formula (9), and its value range can be 0.1 μA/V to 100 μA/v, preferably 2 μA/v, and the resistance value of the reference resistor $R_{SET}$ is the same as that in the above Example 3. Furthermore, tin this example, the second predetermined multiple M is the same as that in the above Example 3, and its value range can be 0.1 μA/V to 100 μA/V, preferably 1 μA/V.

The operation principle of the first control unit A1 is realized with reference to the above Examples 2 and 3, and will not be further described here.

Example 6

In this example, the flyback converter works in CCM mode, and its overall circuit diagram is shown in FIG. 5.

Figure 11:
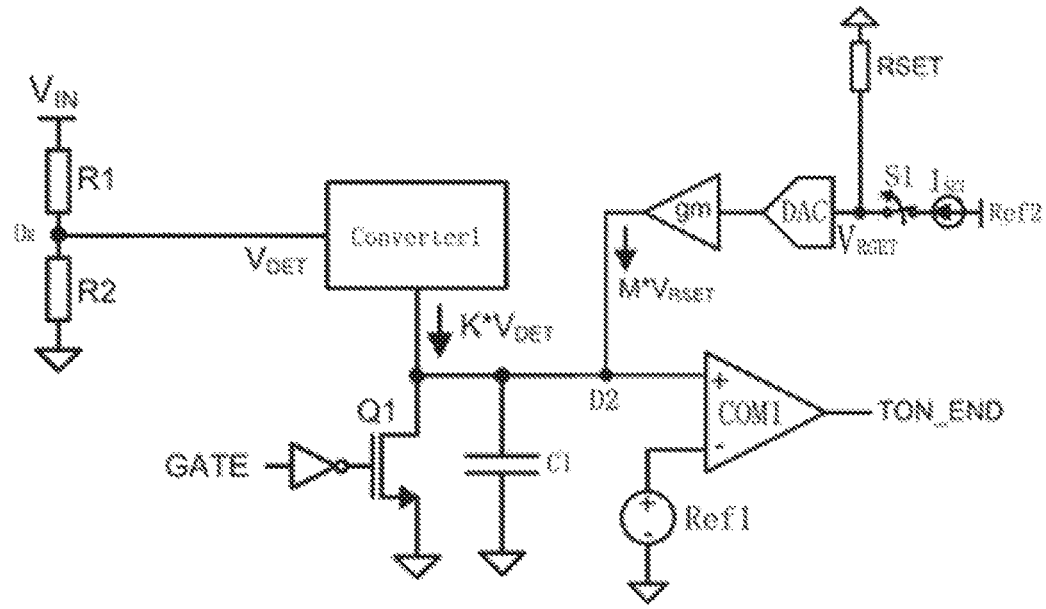
FIG. 11 is a circuit diagram of the flyback converter in examples of the present disclosure.

As shown in FIG. 11, the first control unit includes a first amplifier module Converter1, the input terminal of the first amplifier module Converter1 is connected to the first voltage terminal, the output terminal of the first amplifier module is connected to the positive input terminal of the first comparator COM1 through a second node D2, and the first amplifier module Converter1 is used to amplify the input voltage by a first predetermined multiple K before output.

The first control unit further includes a first field effect transistor Q1, the gate of the first field effect transistor is connected to the gate of the main switch through an inverter, the drain of the first field effect transistor Q1 is connected to the positive input terminal of the first comparator through the second node D2, and the source of the first field effect transistor Q1 is grounded.

The first control unit further includes a first capacitor C1, one end of the first capacitor C1 is connected to the positive input terminal of the first comparator COM1 through the second node D2, and the other end is grounded. The first reference terminal Ref1 is connected to the inverting input terminal of the first comparator COM1 to provide a first reference voltage $V_{REF\_ON}$.

The first control unit further includes a reference module, the input terminal of the reference module is connected to a set voltage terminal with a predetermined voltage value, and the output end of the reference module is connected to the positive input terminal of the first comparator COM1 through the second node D2. The reference module is used for amplifying the voltage input to the reference module before output. The output terminal of the first comparator COM1 is connected to the output terminal of the first control unit A1. When the voltage value of the positive input terminal of the first comparator COM1 is greater than the first reference voltage $V_{REF\_ON}$, the output terminal of the first comparator COM1 outputs the second control signal.

The set voltage terminal includes a reference resistor $R_{SET}$ and a set current terminal Ref2, which are respectively connected to the input terminal of the reference module.

The first control unit further includes a switch S1 arranged between the set current end Ref2 and the input terminal of the reference module. The switch S1 is initially turned on. When the input current $I_{SET}$ of the set current terminal Ref2 is set, the switch S1 is disconnected. The reference module further includes a digital analog converter (DAC), the input terminal of the DAC is used to lock the input voltage $V_{RSET}$ transferred by the set current terminal Ref2 after the switch S1 is disconnected.

The first control unit further includes an amplifier gm, the input end of the amplifier gm is connected to the output end of DAC, and the output end of amplifier gm is connected to the first comparator COM1 through the second node D2. The amplifier gm is used to amplify the voltage $V_{RSET}$ output from the set voltage terminal at the second predetermined multiple M and then output.

The first voltage terminal is connected to the input terminal of flyback converter through a first resistor R1, so that the first voltage is proportional to the input voltage $V_{IN}$ of the input terminal of flyback converter.

The first control unit further includes a connection node $D_R$ arranged between the first voltage terminal and the first resistor R1.

The flyback converter also includes a second resistor R2, which is connected between the connection node $D_R$ and the grounding terminal.

The difference between this example and the above Example 4 is that the first voltage terminal in this example no longer provides the auxiliary winding voltage $V_{AUX}$ by the auxiliary coil AUX, but directly detects the input voltage $V_{IN}$ of the primary side to obtain the first voltage proportional to the input voltage $V_{IN}$. The second resistor R2 in this example is a required resistor. Moreover, the first amplifier module in this example is realized by the voltage to current module Converter1.

In other words, the circuit structure of the first control unit A1 in the present example can be obtained by combining the structure setting of the first voltage terminal in the second example with the rest of the structure settings in the third example. Therefore, in this example, the resistance values of the first resistor R1 and the second resistor R2 can be determined by the above formula (10), and the first predetermined multiple K can be determined by the above formula (9), with its value range of 0.1 μA/V to 100 Ma/V, preferably 2 μA/V. The resistance value of the reference resistor $R_{SET}$ in this example is the same as that in the above Example 3. Furthermore, the second predetermined multiple M in this example is the same as that in the above Example 3, and its value range can be 0.1 Ma/V to 100 μA/V, preferably 1 μA/V.

The operation principle of the first control unit A1 is realized with reference to the above Examples 2 and 4, and will not be described here.

The circuit structure and working principle of flyback converter in DCM mode and CCM mode are described in the above examples 1 to 6. Specifically, Examples 1 and 2 illustrate the circuit structure and working principle of the flyback converter in DCM mode, and Examples 3 to 6 illustrate the circuit structure and working principle of the flyback converter in CCM mode.

In combination with the above examples 1 to 6, the circuit structure and working principle are illustrated through the 4 examples as shown below (Examples 7 to 10) when the flyback converter can support both DCM mode and CCM mode.

Example 7

Figure 12:
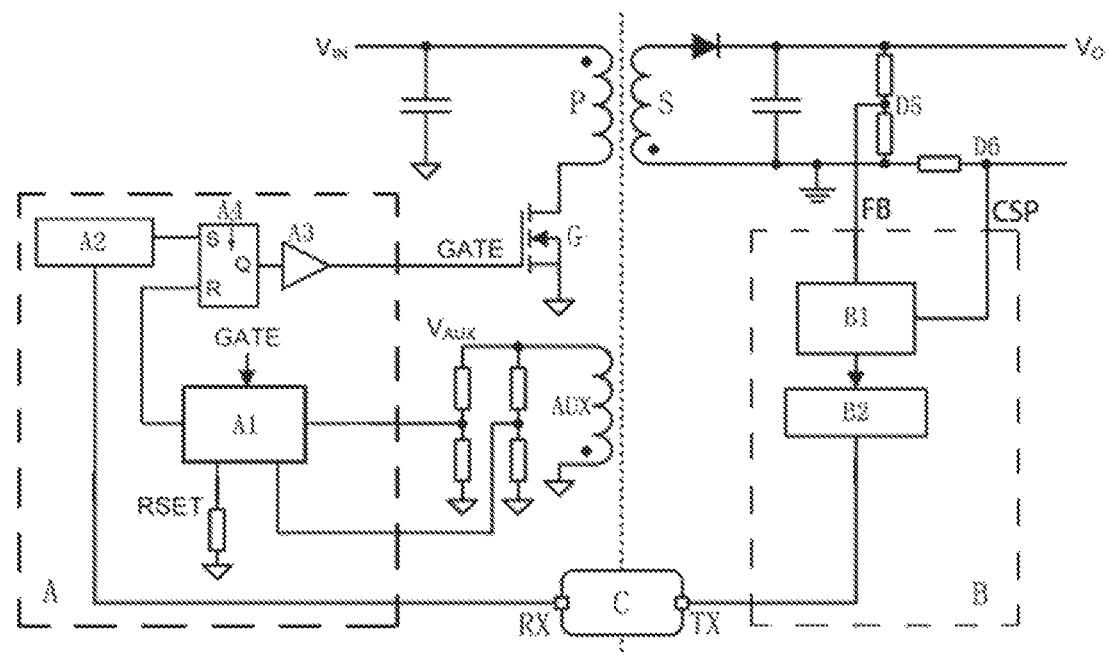
FIGS. 12-13 are the circuit diagrams of the flyback converter in examples of the present disclosure.

In this example, the flyback converter can work in both DCM mode and CCM mode, that is, the flyback converter supports both DCM mode and CCM mode, and its circuit diagram is shown in FIG. 12.

Figure 13:
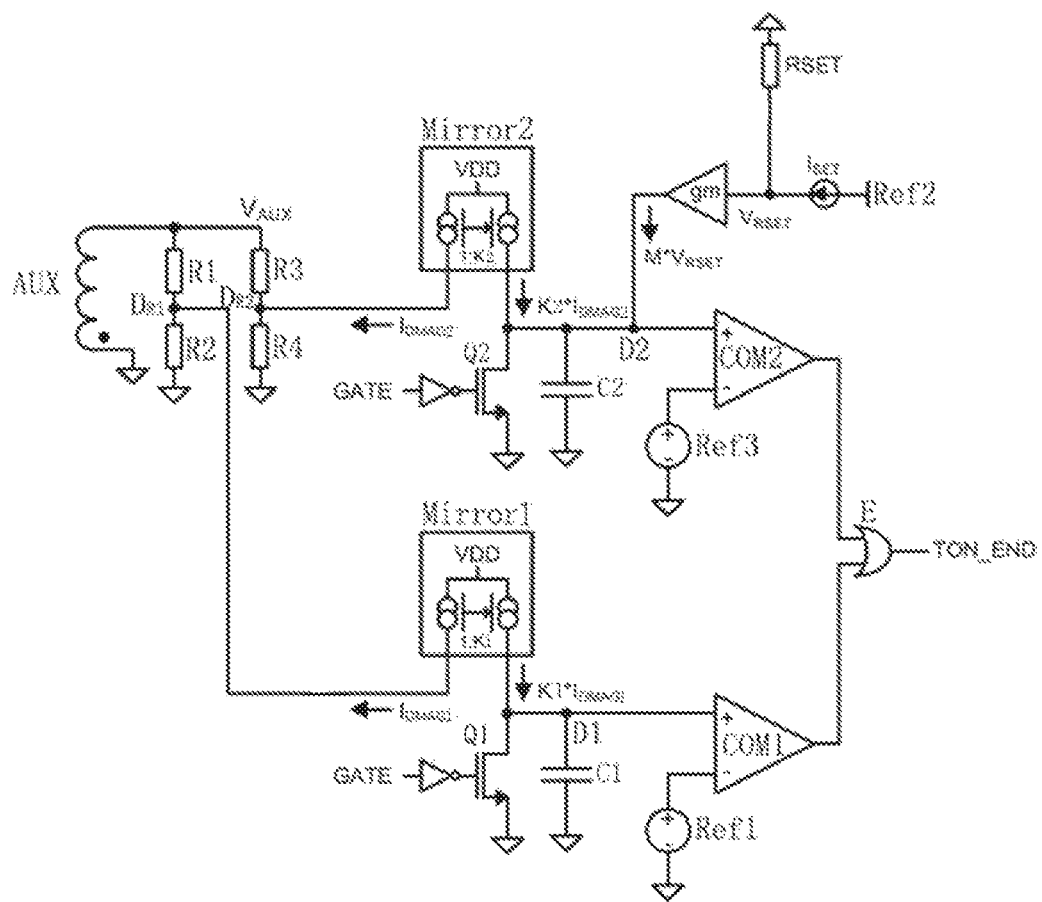

As shown in FIG. 13, the first control unit A1 specifically includes a first control module, an input terminal of the first control module is connected to a first voltage terminal, and a second control module, an input terminal of the second control module is connected to a second voltage terminal.

The first control unit A1 further includes a decision module E, two input terminals of the decision module E are connected to output terminals of the first and the second control modules, respectively, and an output terminal of the decision module E functions as the output terminal of the first control unit. When the first control module or the second control module outputs a predetermined signal, the decision module E outputs the first control signal.

The first control module includes a first amplifier module, an input end of the first amplifier module is connected to the first voltage terminal, an output terminal of the first amplifier module is connected to a positive input terminal of a first comparator COM1 through a first node D1, and the first amplifier module is used to amplify a current flowing through the first amplifier module by a first predetermined multiple K1 before output.

The first control unit A1 further includes a first field effect transistor Q1, the gate of the first field effect transistor Q1 is connected to the gate of the main switch G through an inverter, the drain of the first field effect transistor Q1 is connected to the positive input terminal of the first comparator COM1 through the first node D1, and the source of the first field effect transistor Q1 is grounded.

The first control unit A1 further includes a first capacitor C1, one end of the first capacitor C1 is connected to the positive input terminal of the first comparator COM1 through the first node D1, and the other end is grounded. A first reference terminal Ref1, which is connected to the inverting input terminal of the first comparator COM1 to provide a first reference voltage $V_{REF\_ON1}$. The output terminal of the first comparator COM1 is connected to the input terminal of the decision module. When the voltage value of the positive input terminal of the first comparator COM1 is greater than the first reference voltage $V_{REF\_ON1}$, the output terminal of the first comparator COM1 outputs a predetermined signal (high level signal).

The second control module includes a second amplifier module, an input terminal of the second amplifier module is connected to the second voltage terminal, an output terminal of the second amplifier module is connected to a positive input terminal of a second comparator COM2 through a second node D2, and the second amplifier module is used to amplify a current flowing through the second amplifier module by the third preset multiple K2 before output. The second control module further includes a second field effect transistor Q2, the gate of the second field effect transistor Q2 is connected to the gate of the main switch G through an inverter, the drain of the second field effect transistor Q2 is connected to the positive input terminal of the second comparator COM2 through the second node D2, and the source of the second field effect transistor Q2 is grounded.

The second control module further includes a second capacitor C2, one end of the second capacitor C2 is connected to the positive input terminal of the second comparator COM2 through the second node D2 and the other end is grounded, and a second reference terminal Ref3 connected to the inverting input terminal of the second comparator COM2 to provide a second reference voltage $V_{REF\_ON2}$.

The second control module further includes a reference module, the input terminal of the reference module is connected to a set voltage terminal with a predetermined voltage value, and the output end of the reference module is connected to the positive input terminal of the second comparator COM2 through the second node D2. The reference module is used for amplifying the voltage input to the reference module before output.

The output terminal of the second comparator COM2 is connected to the input terminal of the decision module. When the voltage value of the positive input terminal of the second comparator COM2 is greater than the second reference voltage $V_{REF\_ON2}$, the output terminal of the second comparator COM2 outputs a predetermined signal.

The set voltage terminal comprises a reference resistor $R_{SET}$ and a set current terminal Ref2, which are respectively connected to the input terminal of the reference module. The reference resistor $R_{SET}$ has a predetermined resistance value, and the set current terminal Ref2 has a predetermined input current $I_{SET}$.

The reference module includes an amplifier gm, the input terminal of the amplifier gm functions as the input terminal of the reference module, and the output terminal of the amplifier gm is connected to the second comparator COM2 through the second node D2. The amplifier gm is used to amplify the output voltage of the set voltage terminal at the second predetermined multiple M and then output.

A first voltage terminal is connected to an auxiliary coil AUX through a first resistor R1. The auxiliary coil AUX and the primary coil P have a predetermined turn ratio, so that the voltage at the first voltage terminal is proportional to the input voltage of the flyback converter. A second voltage terminal is also connected to the auxiliary coil AUX through a third resistor R3, and the auxiliary coil A and the primary coil P have a predetermined turn ratio, so that the voltage at the second voltage terminal is proportional to the input voltage of the input terminal of the flyback converter. A first connection node $D_{R1}$ is arranged between the first voltage terminal and the first resistor R1.

The flyback converter also includes a second resistor R2, which is connected between the first connection node $D_{R1}$ and the grounding terminal. A second connection node $D_{R2}$ is arranged between the second voltage terminal and the third resistor R3. The flyback converter also includes a fourth resistor R4, which is connected between the second connection node $D_{R2}$ and the grounding terminal.

Specifically, in this example, the first amplifier module is realized by using the current mirror Mirror1, and the first predetermined multiple K1 amplified by the current mirror Mirror1 can be set to a fixed value. Similarly, the second amplifier module is realized by the current mirror Mirror2, and the third predetermined multiple K2 amplified by the current mirror Mirror2 can be set to a fixed value. The value range of the K1 and K2 can be 0.001 to 0.1, preferably 0.01.

In this example, the resistance value of the first resistor R1 can be determined by the above formula (4), wherein K is replaced by K1, C is used to represent the capacitance value of the first capacitor C1, and $V_{REF\_ON}$ is replaced by $V_{REF\_ON1}$. The second resistor R2 is an optional setting scheme and its resistance value is not limited.

In this example, the resistance value of the third resistor R3 is the same as that in Example 3, and the fourth resistor R4 is an optional setting scheme without limiting its resistance value.

In this example, the value of the second predetermined multiple M is the same as that in the third example, ranging from 0.1 µA/V to 100 µA/V, and preferably 1 µA/V.

In this example, the value range of $V_{RSET}$ at the set voltage terminal can be 0.1V to 5V, preferably 0.65V.

The resistance value of the reference resistor $R_{SET}$ is the same as that of Example 3.

The decision module E is actually an OR gate circuit module. When one of the two input terminals of the OR gate circuit module inputs a high level signal, the output terminal of the OR gate circuit module outputs a second control signal (high level signal). The structure of the OR gate circuit module can be realized by using the existing OR gate circuit, which will not be further described here.

In this example, as far as the first control module is concerned, when the flyback converter is switched on, the first amplifier module Mirror1 detects the voltage $V_{AUX}$ of the auxiliary coil AUX and thus obtains the demagnetization current $I_{DMAG1}$, which is amplified by K1 times to form $K1*I_{DMAG1}$ and $K1*I_{DMAG1}$ is thereafter sent to the positive input terminal of the first comparator COM1. Meanwhile, the inverting input terminal of the first comparator COM1 is connected to the first reference terminal Ref1 to input the first reference voltage $V_{REF\_ON1}$. If the input signal of the positive input terminal of the first comparator COM1 is larger than the input signal of its inverting input terminal, the first comparator COM1 outputs a predetermined signal, that is, a high level signal.

For the second control module, when the flyback converter is switched on, the demagnetizing current $I_{DMAG2}$ obtained by detecting the voltage $V_{AUX}$ of the auxiliary coil AUX by the second amplifier module Mirror2 is amplified by K2 times to form $K2*I_{DMAG2}$, which is sent to the positive input terminal of the second comparator COM2. Meanwhile, the reference module gm amplifies the set voltage $V_{RSET}$ from the set voltage terminal by M times to form $M*V_{RSET}$, which is sent to the positive input terminal of the second comparator COM2. The inverting input terminal of the second comparator COM2 is connected to the second reference terminal Ref3 to input the first reference voltage $V_{REF\_ON2}$. If the input signal of the positive input terminal of the second comparator COM2 is larger than the input signal of its inverting input terminal, the second comparator COM2 outputs a predetermined signal, that is, a high-level signal.

When the first control module or the second control module outputs a predetermined signal, the decision module E outputs a second control signal to drive the main switch G to disconnect, and the flyback converter is switched off.

Example 8

In this example, the flyback converter can work in DCM mode and CCM mode, that is, the flyback converter supports both DCM mode and CCM mode, and its circuit diagram is shown in FIG. 12.

Figure 14:
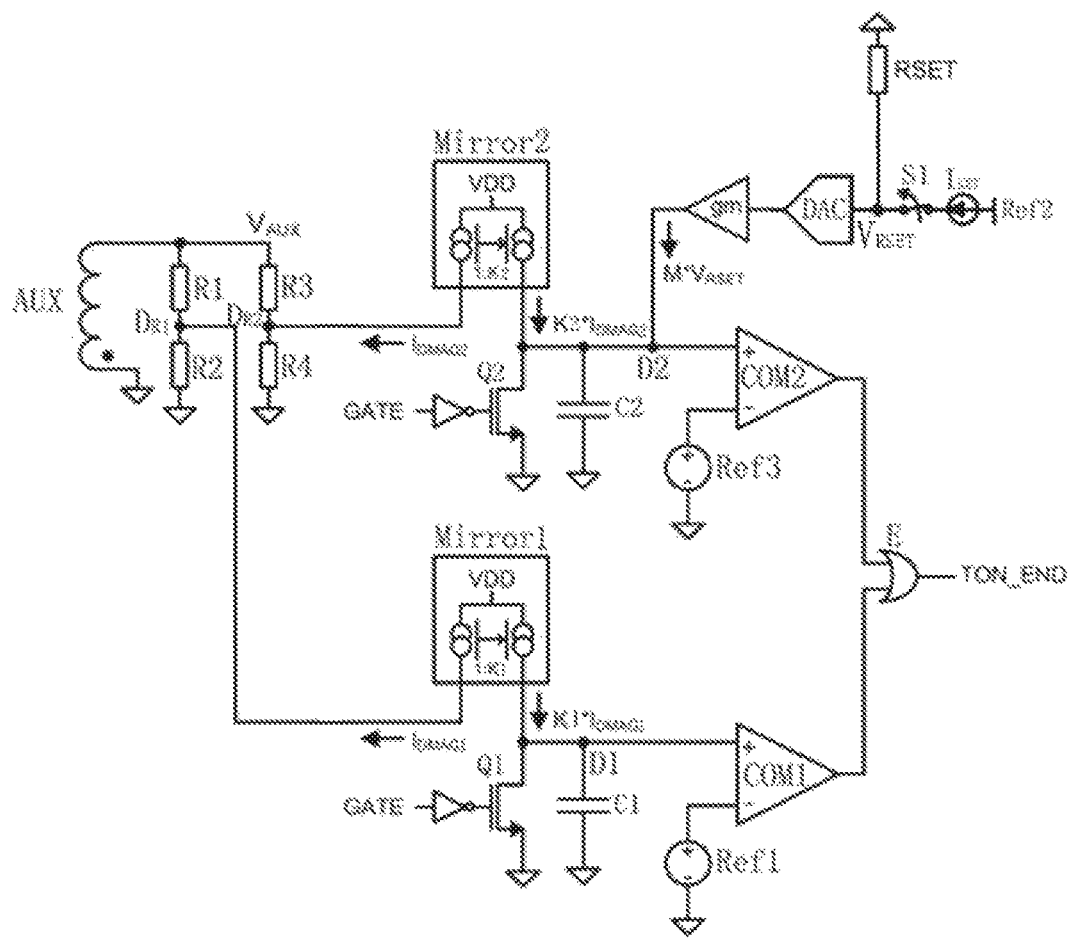
FIG. 14 is a circuit diagram of the flyback converter in examples of the present disclosure.

As shown in FIG. 14, the first control module A1 includes a first control module having its input terminal connected to a first voltage terminal, and a second control module having its input terminal connected to a second voltage terminal.

The first control module A1 also includes a decision module E having two input terminals connected to the output terminals of the first and the second control modules respectively, and the output terminal of the decision module E functions as the output terminal of the first control module. When the first control module or the second control module outputs a predetermined signal, the decision module E outputs the first control signal.

The first control module includes a first amplifier module having its input connected to the first voltage terminal and its output terminal connected to the positive input terminal of the first comparator COM1 through a first node D1. The first amplifier module is used to amplify the input current $I_{DMAG1}$ to a first predetermined multiple K1 before output, and the first amplifier module can be realized by using the current mirror Mirror1.

The first control module includes a first field effect transistor Q1, where the gate of the first field effect transistor Q1 is connected to the gate of the main switch g through an inverter, the drain of the first field effect transistor Q1 is connected to the positive input terminal of the first comparator COM1 through the first node D1, and the source of the first field effect transistor Q1 is grounded.

The first control module further includes a first capacitor C1 having one end connected to the positive input terminal of the first comparator COM1 through the first node D1, and the other end is grounded.

The first control module also includes the first reference terminal REF1, which is connected to the inverting input terminal of the first comparator COM1 to provide a first reference voltage $V_{REF\_ON1}$. The output terminal of the first comparator COM1 is connected to the input terminal of the decision module E. When the voltage value of the positive input terminal of the first comparator COM1 is greater than the first reference voltage $V_{REF\_ON1}$, the output terminal of the first comparator COM1 outputs a predetermined signal.

The second control module includes a second amplifier module, where the input terminal of the second amplifier module is connected to the second voltage terminal, the output terminal of the second amplifier module is connected to the positive input terminal of a second comparator COM2 through a second node D2. The second amplifier module is used to amplify the input current $I_{DMAG2}$ by a third predetermined multiple K2 before output, and the second amplifier module can be realized by using the current mirror Mirror2.

The second control module also includes a second field effect transistor (FET) Q2, where the gate of the second FET Q2 is connected to the gate of the main switch g through an inverter, the drain of the second FET Q2 is connected to the positive input terminal of the second comparator COM2 through the second node D2, and the source of the second FET Q2 is grounded.

The second control module further includes the second capacitor C2 having one end connected to the positive input terminal of the second comparator COM2 through the second node D2 and the other end is grounded.

The second control module further includes the second reference terminal Ref3, which is connected to the inverting input terminal of the second comparator COM2 to provide a second reference voltage $V_{REF\_ON2}$.

The second control module further includes a reference module having the input terminal connected to a set voltage terminal with a predetermined voltage value and the output terminal connected to the positive input terminal of the second comparator COM2 through the second node D2. The reference module is used to amplify and output the voltage input to the reference module. The output terminal of the second comparator COM2 is connected to the input terminal of the decision module E. When the voltage value of the positive input terminal of the second comparator COM2 is greater than the second reference voltage $V_{REF\_ON2}$, the output terminal of the second comparator COM2 outputs a predetermined signal.

The set voltage terminal includes a reference resistor $R_{SET}$ and a set current terminal Ref2, which are connected to the input terminal of the reference module, respectively. The set voltage terminal also includes a switch S1 arranging between the set current terminal Ref2 and the input terminal of the reference module $R_{SET}$. The switch S1 is initially switched on. When the input current $I_{SET}$ of the set current terminal Ref2 is set, the switch S1 is disconnected.

The reference module further includes a DAC, where the input terminal of the DAC functions as the input terminal of the reference module. After the switch S1 is disconnected, DAC is used to lock the input voltage $V_{RSET}$ transmitted by the set current terminal Ref2.

The reference module further includes an amplifier gm having the input terminal connected to the output terminal of DAC and the output terminal connected to the second comparator COM2 through the second node D2. The amplifier gm is used to amplify and output the voltage $V_{RSET}$ from the set voltage terminal by the second predetermined multiple M.

The first voltage terminal is connected to an auxiliary coil AUX through a first resistor R1. The auxiliary coil AUX and the primary coil P have a predetermined turn ratio, so that the input voltage of the first voltage terminal is proportional to the input voltage of the flyback converter. The second voltage terminal is also connected to an auxiliary coil AUX through a third resistor R3. The auxiliary coil AUX and the primary coil P have a predetermined turn ratio, so that the input voltage of the second voltage terminal is proportional to the input voltage of the flyback converter. A first connection node $D_{R1}$ is arranged between the first voltage terminal and the first resistor R1.

The flyback converter also includes a second resistor R2 connected between the first connection node $D_{R1}$ and the grounding terminal. A second connection node $D_{R2}$ is arranged between the second voltage terminal and the third resistor R3.

The flyback converter also includes a fourth resistor R4 connected between the second connection node $D_{R2}$ and the grounding terminal.

The only difference between the present example and Example 7 is that a switch S1 is arranged at the set voltage terminal, and the switch S1 is disconnected after the current $I_{SET}$ is set at the set current terminal Ref2, so that the DAC can lock the input voltage $V_{RSET}$. The process can refer to the Examples 4 and 6, and will not be described here.

Other operation principles in this example can refer to Example 7, and will not be described here.

Example 9

Figure 15:
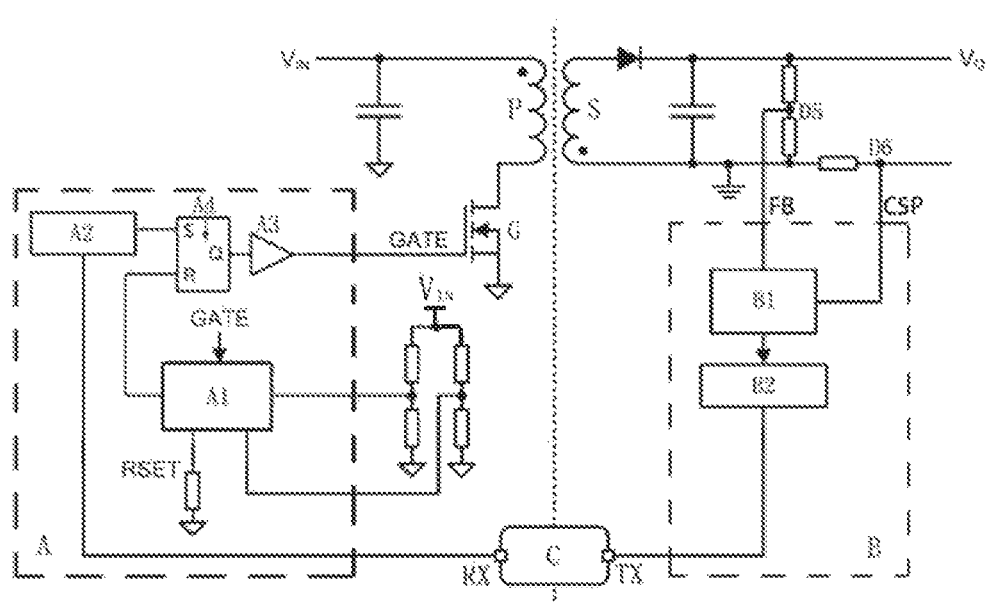
FIGS. 15-16 are the circuit diagram of the flyback converter in examples of the present disclosure.

In this example, the flyback converter can work in DCM mode and CCM mode, that is, the flyback converter supports both DCM mode and CCM mode, and its circuit diagram is shown in FIG. 15.

Figure 16:
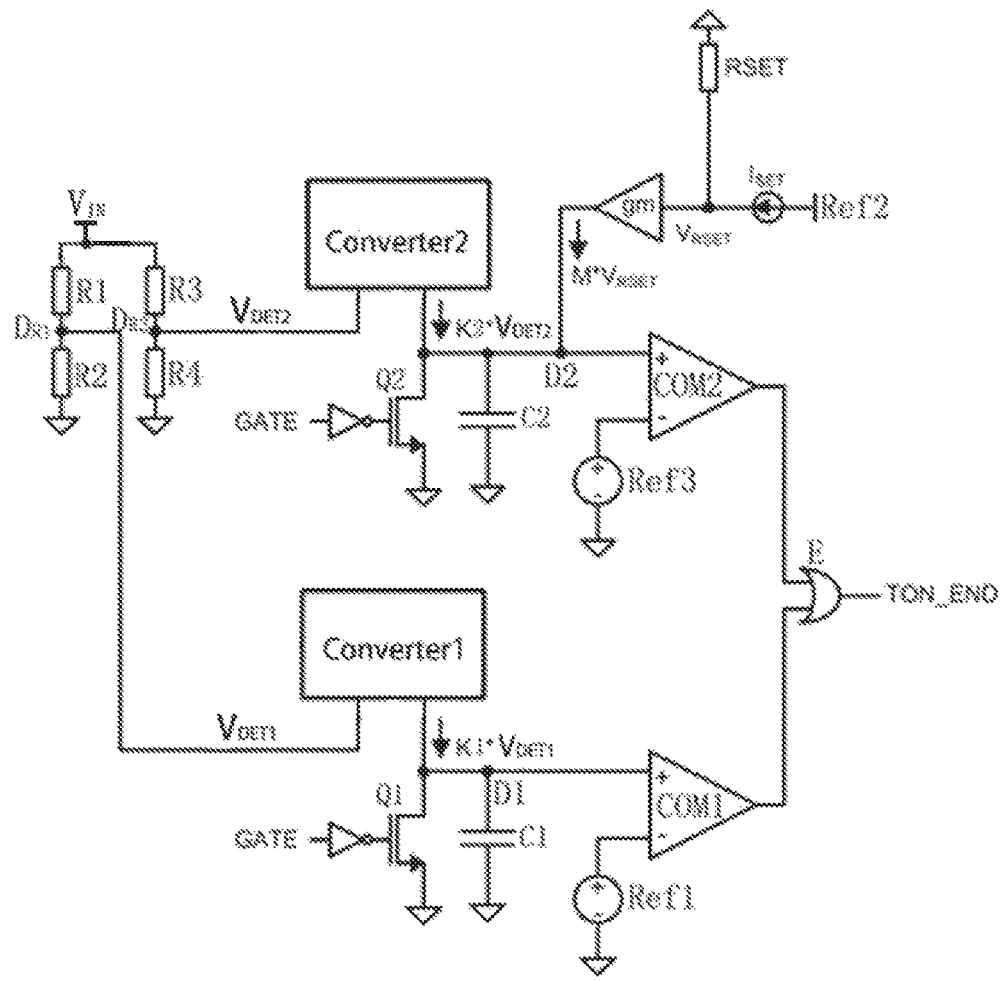

As shown in FIG. 16, the first control unit A1 includes a first control module having the input terminal connected to a first voltage terminal, a second control module having the input terminal connected to a second voltage terminal, and a decision module E having two input terminals connected to the output terminals of the first and the second control modules respectively and the output terminal of the decision module E functions as the output terminal of the first control unit. When the first control module or the second control module outputs a predetermined signal, the decision module E outputs the first control signal.

The first control module includes a first amplifier module Converter1 having the input terminal connected to the first voltage terminal and the output terminal connected to the positive input terminal of the first comparator through a first node D1. The first amplifier module Converter1 is used to amplify the input voltage by a first predetermined multiple K1 before output. In this example, the first amplifier module is realized by employing the first voltage-to-current module Converter1. The determination method of K1 can refer to the above formula (9), and its value range can be 0.1 µA/V to 100 µA/V, preferably 2 µA/V.

The first control module further includes a first field effect transistor Q1, where the gate of the first field effect transistor Q1 is connected to the gate of the main switch through an inverter, the drain of the first field effect transistor Q1 is connected to the positive input terminal of the first comparator COM1 through the first node D1, and the source of the first field effect transistor Q1 is grounded.

The first control module also includes a first capacitor C1 having one end connected to the positive input terminal of the first comparator COM1 through the first node D1 and the other end is grounded.

The first control module further includes a first reference terminal Ref1, which is connected to the inverting input terminal of the first comparator COM1 to provide a first reference voltage $V_{REF\_ON1}$. The output terminal of the first comparator COM1 is connected to the input terminal of the decision module E. When the voltage at the positive input terminal of the first comparator COM1 is greater than the first reference voltage $V_{REF\_ON1}$, the output terminal of the first comparator COM1 outputs the predetermined signal.

The second control module includes a second amplifier module Converter2 having the input terminal connected to the second voltage terminal and the output terminal connected to the positive input terminal of a second comparator COM2 through a second node D2. The second amplifier module Converter2 is used to amplify the input voltage by a third predetermined multiple K2 before output, and the determination method of K2 can refer to the above formula (9), wherein the value range can be 0.1 µA/V to 100 µA/v, preferably 2 µA/V.

The second control module also includes a second field effect transistor Q2, where the gate of the second FET Q2 is connected to the gate of the main switch through an inverter, the drain of the second FET Q2 is connected to the positive input terminal of the second comparator COM2 through the second node D2, and the source of the second FET Q2 is grounded.

The second control module further includes the second capacitor C2 having one end connected to the positive input terminal of the second comparator COM2 through the second node D2 and the other end grounded.

The second control module further includes the second reference terminal Ref3, which is connected to the inverting input terminal of the second comparator COM2 to provide a second reference voltage $V_{REF\_ON2}$.

The second control module further includes a reference module having the input terminal connected to a set voltage terminal with preset voltage value and the output terminal connected to the positive input terminal of the second comparator COM2. The reference module is used to amplify and process the voltage input to the reference module before output. The output terminal of the second comparator COM2 is connected to the input terminal of the decision module E. When the voltage at the positive input terminal of the second comparator COM2 is greater than the second reference voltage $V_{REF\_ON2}$, the output terminal of the second comparator outputs a predetermined signal.

The set voltage terminal included a reference resistor $R_{SET}$ and a set current terminal Ref2, which are connected to the input terminal of the reference module, respectively. The reference resistor $R_{SET}$ has a preset resistance value and the set current terminal Ref2 has a preset input current $I_{SET}$.

The reference module includes an amplifier gm having the input terminal functioning as the input terminal of the reference module and the output terminal connected to the second comparator COM2 through the second node D2. The amplifier gm is used to amplify and output the voltage $V_{RSET}$ output from the set voltage terminal by the second predetermined multiple M.

The first voltage terminal is connected to the input terminal of the flyback converter through a first resistor R1, so that the voltage at the first voltage terminal is proportional to the input voltage $V_{IN}$ at the input terminal of the flyback converter. A first connection node $D_{R1}$ is arranged between the first voltage terminal and the first resistor R1.

The flyback converter further includes a second resistor R2 connected between the first connection node $D_{R1}$ and the grounding terminal. The second voltage terminal is further connected to the input terminal of the flyback converter through a third resistor R3 so that the voltage at the second voltage terminal is proportional to the input voltage $V_{IN}$ from the input terminal of the flyback converter. A second connection node $D_{R2}$ is arranged between the second voltage terminal and the third resistor R3.

The flyback converter further includes a fourth resistor R4 connected between the second connection node $D_{R2}$ and the grounding terminal.

In particular, the difference between this example and Example 7 are as follows:

a. The first and second voltage terminals no longer generate voltage by the auxiliary winding AUX and proportional to the input voltage $V_{IN}$, but directly detects the input voltage $V_{IN}$, so as to obtain the first voltage $V_{DET1}$ and second voltage $V_{DET2}$ proportional to the input voltage $V_{IN}$.

b. The first and the second amplifier modules in this example are no longer current mirror, but voltage-to-current module Converter1 ad Converter2, which convert voltage $V_{DET}$ to current $K \cdot V_{DET}$ by a predetermined multiple K.

c. the first predetermined multiple K1 and the third predetermined multiple K2 can be determined by the above Formula (9) (use K1 and K2 to replace K).

d. The second resistor R2 in this example is a required circuit component. The resistance relationship between the first resistor R1 and the second resistor R2 can be determined by the above formula (10), C in formula (10) represents the capacitance value of the first capacitor C1, $V_{REF\_ON1}$ is used to replace $V_{REF\_ON}$, and K1 is used to replace K.

Similarly, the fourth resistor in this example is a required circuit component, and the resistance relationship between the third resistor R3 and the fourth resistor R4 can be determined by the above formula (10), C in formula (10) represents the capacitance value of the first capacitor C2, $V_{REF\_ON2}$ is used to replace $V_{REF\_ON}$, and K2 is used to replace K.

In this example, other operation principles and structural settings of the first control unit A1 can be carried out with reference to Example 7, which will not be described here.

Example 10

In this example, the flyback converter can work in DCM mode and CCM mode, that is, the flyback converter supports both DCM mode and CCM mode, and its circuit diagram is shown in FIG. 15.

Figure 17:
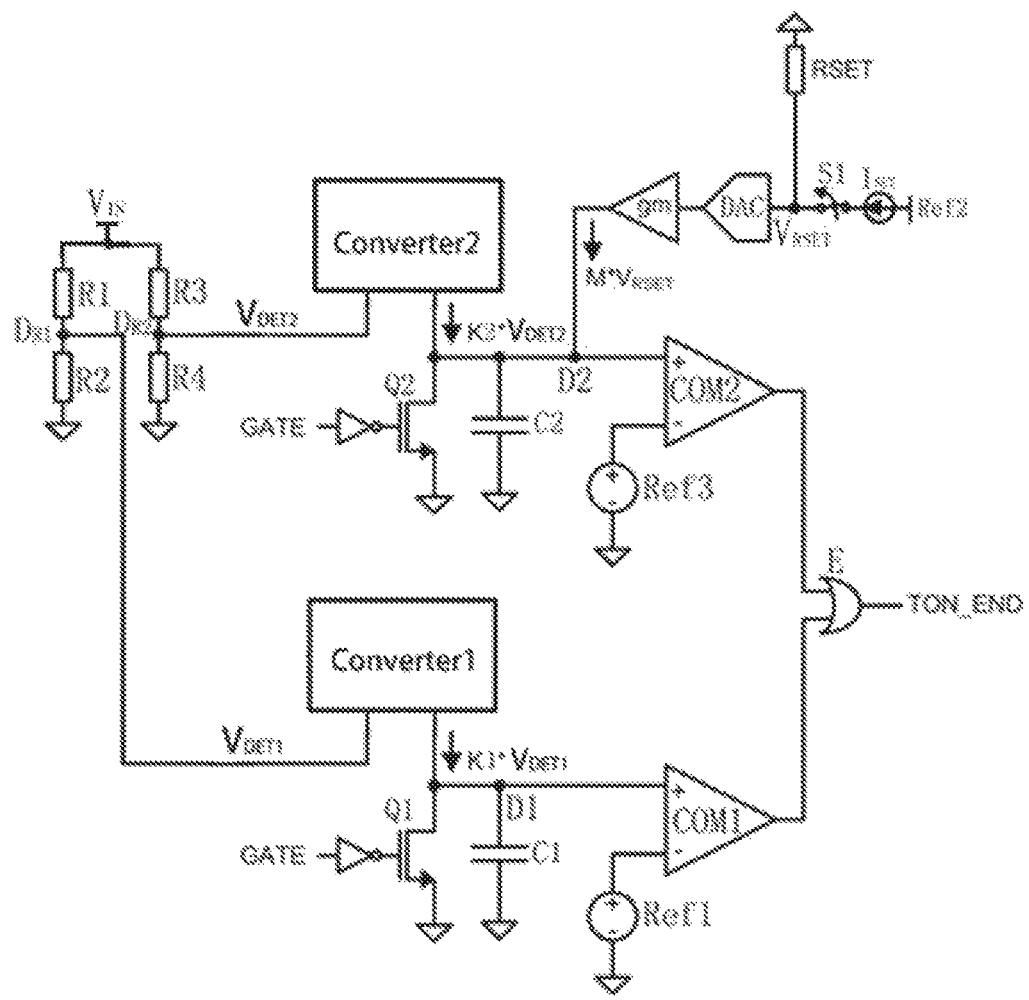
FIG. 17 is the circuit diagram of the flyback converter in examples of the present disclosure.

As shown in FIG. 17, the first control unit A1 includes the first control module and having the input terminal connected to a first voltage terminal and the second control module having the input terminal connected to a second voltage terminal.

The first control unit A1 also includes the decision module E having the two input terminals connected to the output terminals of the first and the second control modules respectively, and the output terminal functioning as the output terminal of the first control unit. When the first or the second control module outputs a predetermined signal, the decision module outputs the first control signal.

The first control module includes the first amplifier module Converter1 having the input terminal connected to the first voltage terminal and the output terminal connected to the positive input terminal of a first comparator through a first connection node D1. The first amplifier module Converter1 is used to amplify and output the input voltage by a predetermined multiple K1. The first amplifier module in this example is realized by employing the first voltage-to-current module Converter1. K1 can be determined according to the above Formula (9), wherein its range can be 0.1 μA/V to 100 μA/V, preferably 2 μA/V.

The first control module further includes the first field effect transistor Q1, where the gate of the first field effect transistor Q1 is connected to the gate of the main switch through an inverter, the drain of the first field effect transistor is connected to the positive input terminal of the first comparator COM1 through the first connection node D1, and the source of the first field effect transistor Q1 is grounded.

The first control module further includes the first capacitor C1 having one end connected to the positive input terminal of the first comparator COM1 via the first connection node D1 and the other end grounded.

The first control module also includes the first reference terminal Ref1 connected to the inverting input terminal of the first comparator COM1 to provide a first reference voltage $V_{REF\_ON1}$. The output terminal of the first comparator COM1 is connected to the input terminal of the decision module E. When the voltage at the positive input terminal of the first comparator COM1 is greater than the first reference voltage $V_{REF\_ON1}$, the output terminal of the first comparator COM1 outputs a predetermined signal.

The second control module includes the second amplifier module Converter2 having the input terminal connected to the second voltage terminal and the output terminal connected to the positive input terminal of a second comparator COM2 through a second connection node D2. The second amplifier module Converter2 is used to amplify and output the input voltage by a third predetermined multiple K2. K1 can be determined according to the above Formula (9), wherein its range can be 0.1 μA/V to 100 μA/V, preferably 2 μA/V.

The second control module further includes the second field effect transistor Q2, where the gate of the second field effect transistor Q2 is connected to the gate of the main switch via an inverter, the drain of the second field effect transistor is connected to the positive input terminal of the second comparator COM2 via the second connection node D2 and the source of the second field effect transistor Q2 is grounded.

The second control module also includes the second capacitor C2 having one end of the second capacitor C2 connected to the positive input terminal of the second comparator COM2 and the other terminal grounded.

The second control module further includes the second reference terminal Ref3 connected to the inverting input terminal of the second comparator COM2 to provide a second reference voltage $V_{REF\_ON2}$.

The second control module further includes a reference module having the input terminal connected to a set voltage terminal with preset voltage value and the output terminal connected to the positive input terminal of the second comparator COM2. The reference module is used to amplify and process the voltage input to the reference module before output. The output terminal of the second comparator COM2 is connected to the decision module E. When the voltage at the positive input terminal of the second comparator COM2 is greater than the second reference voltage $V_{REF\_ON2}$, the output terminal of the second comparator outputs a predetermined signal.

The set voltage terminal comprises a reference resistor $R_{SET}$ and a set current terminal Ref2, which are connected to the input terminal of the reference module, respectively. A switch S1 is arranged between the set current terminal Ref2 and the input terminal of the reference module. The switch S1 is initially switched on and after the input current $I_{SET}$ of the set current terminal Ref2 is set, the switch S1 is switched off.

The reference module further includes a DAC, where the input terminal of the DAC functions as the input terminal of the reference module. After the switch S1 is disconnected, DAC is used to lock the input voltage $V_{RSET}$ from the set current terminal Ref2.

The reference module further includes an amplifier gm having the input terminal connected to the output terminal of the DAC and the output terminal connected to the second comparator COM2 via the second connection node D2. The amplifier gm is used to amplify, process and output the voltage $V_{RSET}$ from the set voltage terminal by a second predetermined multiple K.

The first voltage terminal is connected to the input terminal of the flyback converter via a first resistor R1 so that the voltage at the first voltage terminal is proportional to the input voltage $V_{IN}$ at the input terminal of the flyback converter. A first connection node $D_{R1}$ is arranged between the first voltage terminal and the first resistor R1.

The flyback converter further includes a second resistor R2, which is connected between the first connection node $D_{R1}$ and the grounding terminal. The second voltage terminal is connected to the input terminal of the flyback converter via a third resistor R3 so that the voltage at the second voltage terminal is proportional to the input voltage $V_{IN}$ at the input terminal of the flyback converter. A second connection node $D_{R2}$ is arranged between the second voltage terminal and the third resistor R3. The flyback converter further includes a fourth resistor R4, which is connected between the second connection node $D_{R2}$ and the grounding terminal.

The difference between the present example and Example 9 is that a switch S1 is arranged at the set voltage terminal, and the switch S1 is disconnected after the current $I_{SET}$ is set at the set current terminal Rref2, so that the DAC can lock the input voltage $V_{RSET}$. The process can refer to the above-mentioned Examples 4 and 6, and will not be described here.

Other operation principles in this example can refer to Example 9 and will not be further discussed here.

In addition to the primary controller A described as an example in Examples 1 to 10 above, the secondary controller B in the flyback converter of the present invention is specifically shown in FIGS. 3, 5, 9, 12 and 15 includes the second control unit B1 having the first input terminal FB used to detect the output voltage of the secondary coil and the second input terminal CSP used to detect the output current of the secondary coil. The second control unit B1 is used to obtain and output the first control signal by processing the output voltage and output current of the secondary coil.

The secondary controller B further includes a transmission unit B2 having the input terminal connected to the output terminal of the second control unit B1 and the output terminal connected to the Isolator C. The transmission unit B2 is used to transmit the first control signal output by the second control unit B1 to the receiving unit A2 in the primary controller through the Isolator C.

Specifically, in the present invention, when the flyback converter is switched off, the diode at the secondary side is turned on, the second control unit B1 can detect the output voltage and output current from the secondary side through its first input terminal FB and the second input terminal CSP. Then the second control unit B1 outputs a first control signal to the transmission unit B2 according to the detected output voltage and output current, and the transmission unit B2 transmits the first control signal to the receiving unit A2 in the primary controller A through the Isolator C, so as to enable the drive unit A3 at the primary side to turn on the main switch G, so that the flyback converter is switched on.

In conclusion, in the technical scheme of the present invention, the primary controller is used to perform the calculation and control process of the constant on-time of the flyback converter, which is convenient to obtain the input voltage and other related information, reduces the calculation complexity, reduces the transmission line connection between the primary controller and the secondary controller, and does not affect the detection of the synchronous rectifier in the system. Furthermore, because the primary controller is used to calculate and control the constant on-time of flyback converter, there is no need to worry about the transmission error, and it is also not necessary to set the switch on/off blanking time in the system, so that the flyback converter can be applied to the scenes with high switching frequency. Therefore, the flyback converter in the present invention has better circuit performance than the related structure in the prior art.

In the preferred examples of the present invention, a control method of the flyback converter is also described.

When the flyback converter is switched off, the secondary controller B detects the output circuit of the secondary coil S and generates a first control signal (high level signal). The secondary controller B sends the first control signal to the receiving unit A2 through the Isolator C, the receiving unit A2 sends the first control signal to the resetting terminal S of the trigger A4, and the driving unit A3 drives the main switch to switch on according to the output signal (high level signal) from the output terminal Q of the trigger A4 so that the flyback converter is switched on.

When the main switch is turned on, the first control unit A1 processes the first voltage of the first voltage terminal, the second voltage of the second voltage terminal and the gate voltage GATE of the main switch G and obtains the second control signal (high level signal), which is sent to the resetting terminal R of the trigger A4. The driving unit A3 drives the main switch G to disconnect according to the signal output from the output terminal Q of the trigger A4, so as to switch off the flyback converter.

The switch-on and switch off stages in the above control methods are operated alternately to control the operation state of the flyback converter with constant on time.

Figure 18:
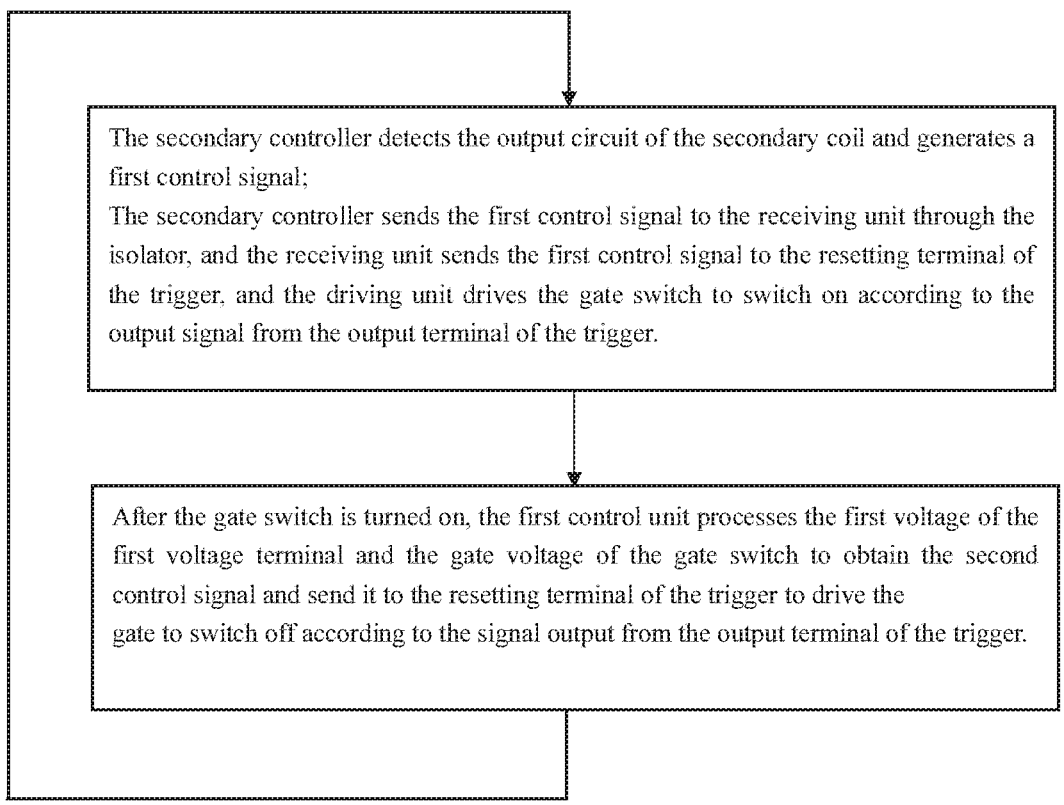
FIG. 18 is a block diagram of the control method of the flyback converter in examples of the present disclosure.

In the above descriptions and FIG. 18 of the present invention, for the convenience of understanding, the switch-off stage of the flyback converter is taken as the starting point of the whole control method. In the actual operation process, the above control method is a cyclic execution process, and the starting point is only when the system is initialized and starts to run, but not in any switch off stage or switch on stage.

Those of ordinary skill in the art may recognize that modifications of the examples disclosed herein are possible. For example, a total number of components in the flyback converter may vary. Other modifications may occur to those of ordinary skill in this art, and all such modifications are deemed to fall within the purview of the present invention, as defined by the claims.

The invention claimed is:

1. A constant on-time flyback converter comprises:
   a main switch;
   an isolator;
   a transformer comprising a primary coil at a primary side connected in series with the main switch between an input terminal of the constant on-time flyback converter and a ground; and
      a secondary coil on a secondary side of the transformer connected between an output terminal of the constant on-time flyback converter and a reference ground potential of the secondary side;
   a primary controller on the primary side connected to a gate of the main switch; and
   a secondary controller on the secondary side coupled to the primary controller on the primary side through the isolator, the secondary controller generating a first control signal according to an output from the output terminal of the constant on-time flyback converter;
   wherein the primary controller comprises:
      a receiving unit connected to the isolator to receive the first control signal generated by the secondary controller; wherein the receiving unit outputs the first control signal as a trigger-on signal;
      a driving unit receives the first control signal and to output a gate-on control signal to turn on the main switch; and
      a first control unit receives the gate-on control signal and generates a second control signal as a trigger-off signal after a constant on-time; wherein the driving unit receives the second control signal to output a gate-off control signal to turn off the main switch.

2. The constant on-time flyback converter of claim 1, wherein the first control unit comprises a first input terminal connected to a first voltage terminal; and
   a second input terminal connected to the gate of the main switch;
   wherein the first control unit processes a first voltage at the first voltage terminal and a voltage at the gate of the main switch to generate the second control signal; and
   wherein the first voltage at the first voltage terminal is proportional to an input voltage at the input terminal of the constant on-time flyback converter.

3. The constant on-time flyback converter of claim 2, wherein the first voltage terminal is connected to a connection node between a first resistor and a second resistor connected in series between an auxiliary coil and the ground; and wherein the auxiliary coil and the primary coil have a predetermined turn ratio.

4. The constant on-time flyback converter of claim 2, wherein the first voltage terminal is connected to a connection node between a first resistor and a second resistor connected in series between the input terminal of the constant on-time flyback converter and the ground.

5. The constant on-time flyback converter of claim 2, wherein the primary controller further comprises a trigger;
   wherein an output terminal of the first control unit is connected to a reset terminal of the trigger;
   wherein an output terminal of the receiving unit is connected to a set terminal of the trigger;
   wherein an output terminal of the trigger is connected to an input of the driving unit having an output terminal connected to the gate of the main switch;
   wherein when the receiving unit outputs the first control signal to the set terminal of the trigger, the driving unit drives the main switch to turn on; and
      when the first control unit outputs the second control signal to the reset terminal of the trigger, the driving unit drives the main switch to turn off; and
   wherein when the main switch is turned on, the first control unit processes the first voltage to generate the second control signal; and
      when the main switch is turn off, the first control unit does not output the second control signal.

6. The constant on-time flyback converter of claim 5, wherein the first control unit further comprises:
   a first amplifier module; wherein an input terminal of the first amplifier module is connected to the first voltage; wherein an output terminal of the first amplifier module is connected to a positive input terminal of a first comparator at a first node; and wherein the first amplifier module amplifies a current or voltage inputted to the first amplifier module by a first predetermined multiple;
   a first field effect transistor; wherein a gate of the first field effect transistor is connected to the gate of the main switch through an inverter; wherein a drain of the first field effect transistor is connected to the positive input terminal of the first comparator at the first node; and wherein a source of the first field effect transistor is grounded;
   a first capacitor connects between the first node and the ground; and
   a first reference terminal connects to an inverting input terminal of the first comparator to provide a first reference voltage;

wherein an output terminal of the first comparator is connected to the output terminal of the first control unit; and wherein when a voltage at the positive input terminal of the first comparator is greater than the first reference voltage, the first comparator outputs the second control signal.

7. The constant on-time flyback converter of claim 6, wherein the flyback converter operates in DCM mode.

8. The constant on-time flyback converter of claim 6, wherein the first amplifier module comprises a current mirror.

9. The constant on-time flyback converter of claim 6, wherein the first amplifier module comprises a voltage to current converter module.

10. The constant on-time flyback converter of claim 5, wherein the first control unit further comprises:
a first amplifier module; wherein an input terminal of the first amplifier module is connected to a first voltage; wherein an output terminal of the first amplifier module is connected to a positive input terminal of a first comparator at a second node; and wherein the first amplifier module amplifies a current flowing through the first amplifier module by a first predetermined multiple before output;
a first field effect transistor; wherein a gate of the first field effect transistor is connected to the gate of the main switch through an inverter; wherein a drain of the first field effect transistor is connected to the positive input terminal of the first comparator at the second node; and wherein a source of the first field effect transistor is grounded;
a first capacitor connects between the second node and an other end is ground;
a first reference terminal connects to an inverting input terminal of the first comparator to provide a first reference voltage; and
a reference module;
wherein an input terminal of the reference module is connected to a set voltage terminal with a predetermined voltage value;
wherein an output terminal of the reference module is connected to the positive input terminal of the first comparator at the second node;
wherein the reference module amplifies and outputs a voltage input to the reference module;
wherein the output terminal of the first comparator is connected to the output terminal of the first control unit; and
wherein when voltage at the positive input terminal of the first comparator is greater than the first reference voltage, the output terminal of the first comparator outputs the second control signal.

11. The constant on-time flyback converter of claim 10, wherein the flyback converter operates in CCM mode.

12. The constant on-time flyback converter of claim 10, wherein the reference module comprises
a. an amplifier;
wherein the set voltage terminal comprises a reference resistor and a set current terminal respectively connected to an input terminal of the amplifier;
wherein the reference resistor has a predetermined resistance value;
wherein the set current terminal has a predetermined input current; and wherein the amplifier amplifies a voltage at the set voltage terminal by a second predetermined multiple and outputs to the first comparator at the second node.

13. The constant on-time flyback converter of claim 10, wherein the set voltage terminal comprises a reference resistor and a set current terminal respectively connected to the input terminal of the reference module;
wherein a switch connected between the set current terminal and the input terminal of the reference module;
wherein the switch is initially switched on, when an input current of the set current terminal is set, the switch is disconnected; and
wherein the reference module further comprises:
a digital-analog converter (DAC) having an input terminal functioning as the input terminal of the reference module; wherein after the switch is disconnected, the DAC locks an input voltage transmitted by the set current terminal;
an amplifier having an input terminal connected to an output terminal of the DAC and an output terminal connected to the first comparator at the second node; wherein the amplifier amplifies the input voltage locked by the DAC by a second predetermined multiple.

14. The constant on-time flyback converter of claim 5, wherein the first control unit further comprises:
a first control module; wherein an input terminal of the first control module is connected to the first voltage terminal;
a second control module; wherein an input terminal of the second control module is connected to a second voltage terminal; and
a decision module; wherein first and second input terminals of the decision module are respectively connected to an output terminal of the first and the second control modules;
and wherein an output terminal of the decision module is the output terminal of the first control module;
wherein when the first or the second control module outputs a predetermined signal, the decision module outputs the first control signal.

15. The constant on-time flyback converter of claim 14, wherein the first control module comprises:
a first amplifier module; wherein an input terminal of the first amplifier module is connected to the first voltage terminal; wherein the output terminal of the first amplifier module is connected to a positive input terminal of a first comparator at a first node; and wherein the first amplifier module amplifies and outputs a current flowing through the first amplifier module by a first predetermined multiple;
a first field effect transistor; wherein a gate of the first field effect transistor is connected to the gate of the main switch through an inverter; wherein a drain of the first field effect transistor is connected to the positive input terminal of the first comparator at the first node; and wherein a source of the first field effect transistor is grounded;
a first capacitor connects between the first node and ground; and
a first reference terminal connects to an inverting input terminal of the first comparator to provide a first reference voltage;
wherein an output terminal of the first comparator is connected to the first input terminal of the decision module; and wherein when voltage at the positive input terminal of the first comparator is greater than the first reference voltage, the output terminal of the first comparator outputs the predetermined signal.

16. The constant on-time flyback converter of claim 14, wherein the second control module comprises:
a second amplifier module; wherein an input terminal of the second amplifier module is connected to the second voltage terminal; wherein an output terminal of the second amplifier module is connected to a positive input terminal of a second comparator at a second node; and wherein the second amplifier module amplifies and outputs a current flowing through the second amplifier module by a third predetermined multiple;
a second field effect transistor; wherein a gate of the second field effect transistor is connected to the gate of the main switch through an inverter; wherein a drain of the second field effect transistor is connected to a positive input terminal of a second comparator at the second node; and wherein a source of the second field effect transistor is grounded;
a second capacitor connects between the second node and ground;
a second reference terminal connects to an inverting input terminal of the second comparator to provide a second reference voltage; and
a reference module, wherein an input terminal of the reference module is connected to a set voltage terminal with a set voltage; wherein an output terminal of the reference module is connected to the positive input terminal of the second comparator at the second node; and
wherein the reference module amplifies and outputs a voltage inputted to the reference module;
wherein an output terminal of the second comparator is connected to the second input terminal of the decision module;
wherein when voltage at the positive input terminal of the second comparator is greater than the second reference voltage, the output terminal of the second comparator outputs the predetermined signal.

17. The constant on-time flyback converter of claim 16, wherein the reference module comprises an amplifier;
wherein the set voltage terminal comprises a reference resistor and a set current terminal, respectively connected to the input terminal of the amplifier;
wherein the reference resistor has a preset resistance value and the set current terminal has a preset input current; and
wherein the amplifier amplifies a voltage at the set voltage terminal by a second predetermined multiple and outputs to a first comparator at the second node.

18. The constant on-time flyback converter of claim 16, wherein the set voltage terminal comprises a reference resistor and a set current terminal, respectively connected to the input terminal of the reference module; and a switch connected between a preset current terminal and the input terminal of the reference module and is initially switched on, wherein when an input current of the set current terminal is set, the switch is disconnected;
wherein the reference module further comprises:
a digital-analog converter (DAC); wherein an input terminal of the DAC functions as the input terminal of the reference module, after the switch is disconnected, the DAC locks an input voltage transmitted by the set current terminal; and
an amplifier; wherein an input terminal of the amplifier is connected to an output terminal of the DAC; wherein an output terminal of the amplifier is connected to the second comparator at the second node; and wherein the amplifier amplifies the input voltage locked by the DAC by a second predetermined multiple.

19. The constant on-time flyback converter of claim 14, wherein the first voltage terminal is connected to a first connection node between a first resistor and a second resistor connected in series between an auxiliary coil and ground;
wherein the auxiliary coil and the primary coil have a predetermined turn ratio;
wherein the second voltage terminal is connected to a second connection node between a third resistor and a fourth resistor connected in series between the auxiliary coil and ground.

20. The constant on-time flyback converter as claimed in claim 14, wherein the first voltage terminal is connected to a first connection node between a first resistor and a second resistor connected in series between the input terminal of the flyback converter and ground; and
wherein the second voltage terminal is connected to a second connection node between a third resistor and a fourth resistor connected in series between the input terminal of the flyback converter and ground.

21. The constant on-time flyback converter of claim 5, wherein the secondary controller further comprises:
a second control unit; wherein a first input terminal of the second control unit detects an output voltage of the secondary coil; wherein a second input terminal of the second control unit detects an output current of the secondary coil; and wherein the second control unit processes the output voltage and the output current from the secondary coil and accordingly, generates the first control signal; and
a transmission unit; wherein an input terminal of the transmission unit is connected to an output terminal of the second control unit; wherein an output terminal of the transmission unit is connected to the isolator; and wherein the transmission unit transmits the first control signal to the receiving unit in the primary controller through the isolator.

* * * * *